US009651976B2

(12) United States Patent
Williams et al.

(10) Patent No.: US 9,651,976 B2
(45) Date of Patent: May 16, 2017

(54) SYSTEM AND METHOD FOR OFFLINE AND ONLINE SUBSTATION SWITCHING

(71) Applicant: Florida Power & Light Company, Juno Beach, FL (US)

(72) Inventors: Greg Williams, Coral Springs, FL (US); Lina Tejada-Cook, Jupiter, FL (US); Nelson Melendez, Wellington, FL (US); Richard Lingenfelder, Jupiter, FL (US); Sengoda Shanmugham, Palm Beach Gardens, FL (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 14/816,256

(22) Filed: Aug. 3, 2015

(65) Prior Publication Data

US 2016/0033987 A1 Feb. 4, 2016

Related U.S. Application Data

(60) Provisional application No. 62/032,242, filed on Aug. 1, 2014.

(51) Int. Cl.
*G06F 17/00* (2006.01)
*G05F 1/66* (2006.01)

(52) U.S. Cl.
CPC .................................... *G05F 1/66* (2013.01)

(58) Field of Classification Search
CPC ..... G06Q 30/02; G06Q 20/341; G07F 7/1008
USPC .................................. 235/375, 380, 462.13
See application file for complete search history.

(56) References Cited

U.S. PATENT DOCUMENTS 4,906,830 A * 3/1990 Hasegawa .......... G06K 17/0022 235/381
5,629,869 A * 5/1997 Johnson ............. H01H 11/0062 361/88

* cited by examiner

*Primary Examiner* — Karl D Frech
(74) *Attorney, Agent, or Firm* — Feldman Gale, P.A.

(57) ABSTRACT

Systems and methods are disclosed that may use GPS, barcodes, RF signals, or other electronic technologies, individually or in combination, to identify a location of a substation at which a switching operation is to occur. At the substation location, a device camera or other optical or radio frequency reading apparatus may be used to scan a barcode or other visible indicia to confirm that the correct device or component is being switched before progressing to the next step in the switching order. RF identification, magnetic striping, and other technologies may also be used.

20 Claims, 22 Drawing Sheets

Continued on Fig. 7B

Switching Steps

IMPORTANT-READ THESE INSTRUCTIONS FIRST
A. As each step is executed VISUALLY VERIFY proper position of switchblades, semaphores and motor operators.
B. Execute in the EXACT SEQUENCE GIVEN.
C. If ANY DISCREPANCY is noted, STOP IMMEDIATELY AND REPORT TO THE DISPATCHER.

401

| | Step | Step Description | Device | Time CPT & Visually Verify | Verified or Completed By | |
|---|---|---|---|---|---|---|
| | 1 | Verify Station number with the dispatcher and enter the No + | | 7/16/2014 13:11:51 | KXD0MQU | ✓ |
| ✓ | 2 | Complete Pre-Switching Checklist + | | 7/16/2014 13:12:02 | KXD0MQU | Start End |
| ✓ | 2 | Complete Pre-Switching Checklist + | | 7/16/2014 13:06:17 | kxk0npi | Start End |
| ✓ | 3 | Read instructions ABC at TOP + | | 7/16/2014 13:12:04 | KXD0MQU | Start End |
| ✓ | 3 | Read instructions ABC at TOP + | | 7/16/2014 13:06:19 | kxk0npi | Start End |
| ✓ | 4 | Check Open + | 2W94 | 7/16/2014 13:12:06 | KXD0MQU | Start End |
| ✓ | 4 | Check Open + | 2W94 | 7/16/2014 13:06:21 | kxk0npi | Start End |
| ✓ | 5 | Open 4 Blades + | 2X82 | 7/16/2014 13:12:07 | KXD0MQU | Start End |
| ✓ | 5 | Open 4 Blades + | 2X82 | 7/16/2014 13:06:23 | kxk0npi | Start End |
| ✓ | 6 | Remove Tag and Close + | 2L14 | 7/16/2014 13:12:09 | KXD0MQU | Start End |
| ✓ | 6 | Remove Tag and Close + | 2L14 | 7/16/2014 13:06:27 | kxk0npi | Start End |
| ✓ | 6a | 4-C-016050-12 for ROACH RAY + | | 7/16/2014 13:12:09 | KXD0MQU | ✓ |
| ✓ | 7 | Turn-on RC + | RC94 | 7/16/2014 13:12:11 | KXD0MQU | Start End |
| ✓ | 8 | Stop and Call Dispatcher + | | 7/16/2014 13:12:14 | KXD0MQU | Start End |
| ✓ | 8 | Stop and Call Dispatcher + | | 7/16/2014 13:06:30 | kxk0npi | Start End |
| ✓ | 9 | Turn-on VCU + | 2W94 | 7/16/2014 13:12:16 | KXD0MQU | Start End |
| ✓ | 10 | Stop and Call Dispatcher + | | 7/16/2014 13:12:18 | KXD0MQU | Start End |
| ✓ | 10a | 4-C-016050-12 for ROACH RAY + | | 7/16/2014 13:12:19 | KXD0MQU | ✓ |

NO MORE STEPS

Executed By: [ ] Switchman Date & Time: [ ]
Reported Executed to: [ ] Dispatcher Date & Time: [ ]

Close

Fig. 7C

SYSTEM AND METHOD FOR OFFLINE AND ONLINE SUBSTATION SWITCHING

This application claims the benefit of U.S. provisional patent application Ser. No. 62/032,242, filed Aug. 1, 2014, the subject matter of which is incorporated herein by reference in its entirety.

FIELD OF THE DISCLOSURE

Aspects of the present invention generally relate to the field of applications for portable multifunction devices such as tablets or smart phones, and more particularly to the use of portable multifunction devices for offline and online substation switching procedures in an electric power transmission and distribution system.

BACKGROUND

Substation switching involves the connecting and disconnecting of transmission lines and substation components in the context of an electric power transmission and distribution system. Switching may allow substation components to become de-energized for maintenance without bringing down the whole system. When switching, it may be important to engage or disengage various substation components in a certain order. Conventionally, power companies utilize service centers that generate hard copy switching orders which indicate a sequence for powering down and then powering up various equipment associated with the switching operation. These hard copy switching orders are distributed to appropriate personnel responsible for executing the switching orders. Changes in orders, malfunctions of switch or other hardware or other types of problems with equipment, and other unforeseen events or circumstances may require switching personnel to interrupt current work and return to the service center so that new or updated switching orders may be retrieved. Therefore, there is a need in the art for an improved method for conducting switching procedures.

BRIEF SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the invention in a simplified form as a prelude to the more detailed description that is presented later.

In one embodiment, the present disclosure describes a method implemented in a computer system for coordinating switching procedures in an electric power transmission and distribution system. The method may include the steps of providing a unique identifier for a component in the transmission and distribution system; requiring an operator to verify the component using the identifier; allowing the operator to execute a switching step associated with the component if the component is verified; and selectively enabling the operator to verify completion of the switching step using the identifier.

The following description and the annexed drawings set forth in detail certain illustrative aspects of the disclosure. These aspects are indicative, however, of but a few of the various ways in which the principles of the system and method disclosed herein may be employed and the system and method disclosed herein is intended to include all such aspects and their equivalents. Other advantages and novel features of the system and method disclosed herein will become apparent from the following detailed description of the system and method disclosed herein when considered in conjunction with the drawings.

BRIEF DESCRIPTION OF THE DRAWINGS

The accompanying drawings, which are incorporated in and constitute a part of this specification, show certain aspects of the present invention and, together with the description, help explain some of the principles associated with the invention.

FIGS. 7A-7C illustrate a user interface for a multi-switchman view in accordance with an embodiment.

DETAILED DESCRIPTION OF THE DISCLOSURE

Figure 1:
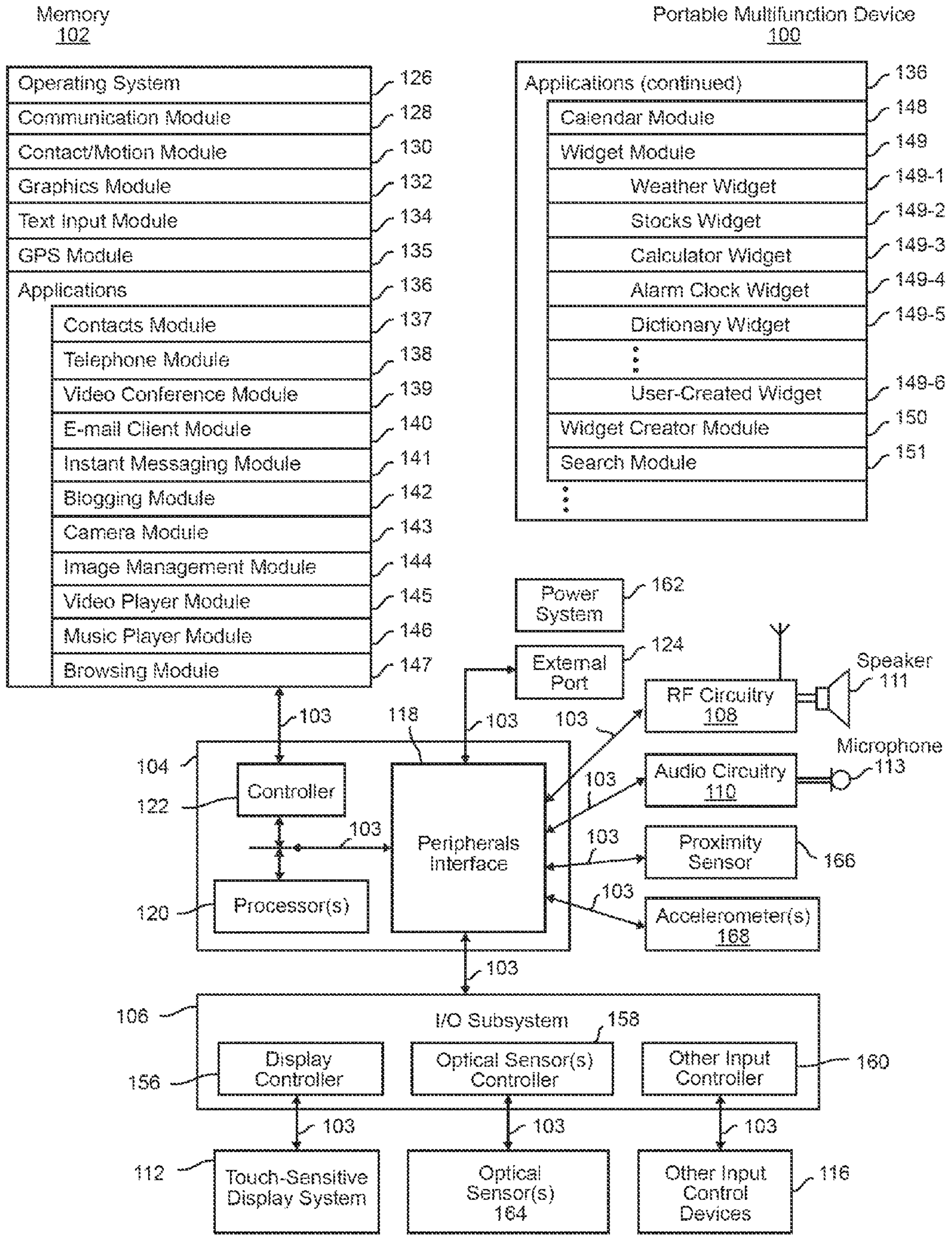
FIG. 1 is a block diagram illustrating a prior art portable multifunction device with a touch-sensitive display that may have utility in accordance with some embodiments of the present invention.

Reference will now be made in detail to embodiments, examples of which are illustrated in the accompanying drawings. The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

A system and method as set forth herein may be embodied in or comprise an application or feature set executed by a portable multifunction device, and may be enabled by or facilitated by a user interface and associated processes and suitable hardware components designed and operative for use in cooperation with such a device. For example, the device may be a portable communications device such as a mobile telephone that also contains other functions, such as personal digital assistant "PDA" functionality and/or music or multimedia player functions. As set forth in more detail below with reference to FIG. 1, the device may also be a tablet computer, a smart phone, a laptop computer or other portable processing apparatus, or the like.

As used herein, the term "application" may refer to a software application embodied in or comprising software code or instruction sets operative to cause or enable a processor or other hardware component, as set forth below, to perform certain functions that will be clear from context. Additionally or alternatively, the term "application" may refer more generally to certain functionality that may be enabled, performed, or facilitated by a microprocessor or other suitable hardware component either independently or in cooperation with software, firmware, or both.

For simplicity, in the discussion that follows, a prior art portable multifunction device that includes a touch screen is used as an example of a device that may be configured and operative to host, or to execute the functionality of, a system and method of the present invention. In particular, a prior art portable multifunction device such as an iPhone™, other smart phone designed and marketed by various companies, or the device disclosed in U.S. Pat. No. 7,479,949, may be used to enable features and functionality of the present invention. In some implementations, the disclosed functionality may also be executed in portable multifunction devices that do not include a touch screen for accepting input information, but that rely instead on a more conventional mechanism such as, for example, point-and-click devices, trackpads, keypads, keyboards, click-wheel mechanisms, and the like.

In addition to supporting the system and method of the present invention, a portable multifunction device such as described below may generally support a variety of applications, such as one or more of the following: a telephone application; a video conferencing application; an e-mail application; an instant messaging application; a blogging application; a photo management application; a digital camera application; a digital video camera application; a web browsing application; a digital music player application; and/or a digital video player application.

FIG. 1 is a block diagram illustrating a prior art portable multifunction device 100, with a touch-sensitive display 112, which may be modified to include some functionality of the present invention. The touch-sensitive display 112 is also known in the art as a touch screen or a touch-sensitive display system. The device 100 may include a memory 102 (which may include one or more computer readable storage media), a memory controller 122, one or more processing units (CPUs) 120, a peripherals interface 118, radio frequency (RF) circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It will be appreciated that the illustrated version of device 100 is only one example of a portable multifunction device 100 that may be used to execute the applications of the present invention, and that device 100 may have more or fewer components than shown, may combine two or more components, or may have a different configuration or arrangement of the components than that shown in FIG. 1. The various components depicted in FIG. 1 may be implemented in hardware, firmware, software, or a combination of these, and may include one or more digital signal processing ("DSP") circuits, application specific integrated circuits ("ASICs"), or other hardware elements or components.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and peripherals interface 118, may be controlled by memory controller 122, as is generally known.

Peripherals interface 118 couples the input and output peripherals of device 100 to CPU 120 and memory 102. The one or more processors 120 run or execute various software programs and/or sets of instructions stored in memory 102 to perform or otherwise to enable various functions (i.e., to execute or to enable applications) for device 100 and to process data.

Peripherals interface 118, CPU 120, and memory controller 122 may be implemented on a single chip, such as a chip 104. These components and others may also be implemented on separate chips as necessary or desired.

Transceiver circuitry 108 receives and sends electromagnetic signals. A person of ordinary skill in the art will recognize that these signals are conventionally referred to as radio frequency ("RF") signals in the context of portable devices, regardless of whether the signals fall within what is conventionally known as the radio spectrum. In that regard, the terms "transceiver circuitry" and "RF circuitry" are used interchangeably in the present application.

RF circuitry 108 converts electrical signals to/from electromagnetic signals and communicates information to and from communications networks and other communications devices by modulating/demodulating electromagnetic signals with data corresponding to the information. RF circuitry 108 may include circuitry known in the art for performing these functions, including but not limited to an antenna system, one or more amplifiers, filters, a tuner, one or more oscillators, a digital signal processor, a CODEC chipset, modulator/demodulator, a subscriber identity module (SIM) card, memory, and so forth. RF circuitry 108 may communicate with any of various networks, such as the Internet, an intranet and/or a wireless network (such as a cellular telephone network, a wireless local area network (LAN) and/or a metropolitan area network (MAN)), and other devices or communications components via known wireless communications standards or protocols. The wireless communication may use any of a plurality of communications standards, protocols, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS), or any other suitable communication protocol, including communication protocols not yet developed as of the filing date of this application.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. Audio circuitry 110 may also include a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input/control devices 116, to peripherals interface 118. I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. Input controller(s) 160 may also be coupled to any (or none) of the following: a keyboard, infrared port, USB port, and a pointer device such as a mouse or a trackpad.

Touch-sensitive touch screen 112 provides an input interface and an output interface between device 100 and a user. Display controller 156 receives and/or sends electrical signals from/to touch screen 112. Touch screen 112 displays visual output to the user. Such visual output may include graphics, text, icons, video, and any combination thereof (collectively termed "graphics").

Touch screen 112 has a touch-sensitive surface, sensor or set of sensors that accepts input from the user through tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images, for instance) that are displayed on touch screen 112. For example, a point of contact between touch screen 112 and the user corresponds to a finger of the user disposed on or making contact with a surface of touch screen 112.

Touch screen 112 may use liquid crystal display (LCD) technology, or light emitting polymer display (LPD) technology, although other display technologies may also be used. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112.

Device 100 also includes a power system 162 for powering the various components such as illustrated in FIG. 1. Power system 162 may include a power management system, one or more power sources (e.g., battery, or alternating current (AC) source), a recharging system, a power failure detection circuit, a power converter or inverter, a power status indicator (e.g., a light-emitting diode (LED) or other battery capacity indicum) and any other components associated with the generation, management, and distribution of power in portable devices.

Device 100 may also include one or more optical sensors 164. FIG. 1 shows an optical sensor 164 that is coupled to an optical sensor controller 158 in I/O subsystem 106. Optical sensor 164 may include charge-coupled device (CCD) or complementary metal-oxide semiconductor (CMOS) phototransistors. In operation, optical sensor 164 receives light from the environment, projected through one or more lenses, and converts received light to data representing an image. In conjunction with an imaging module 143 (also called a camera module), optical sensor 164 may capture still images or video. In some implementations, optical sensor 164 may be located on the back of device 100, opposite touch screen display 112 on the front of the device, so that touch screen display 112 may be used as a viewfinder for either still and/or video image acquisition. Additionally or alternatively, an optical sensor 164 may be located on the front of device 100 so that the user's image may be obtained for videoconferencing while the user views the other video conference participants on touch screen display 112. Preferably, the position of optical sensor 164 can be selectively changed by the user (e.g., by rotating the lens and the sensor in the device housing) so that a single optical sensor 164 may be used along with touch screen display 112 for both video conferencing and still and/or video image acquisition.

Device 100 may also include one or more proximity sensors 166. FIG. 1 shows a proximity sensor 166 coupled to peripherals interface 118. Alternately, proximity sensor 166 may be coupled to an input controller 160 in I/O subsystem 106. Proximity sensor 166 may be used to turn off and disable touch screen 112 when multifunction device 100 is placed near the user's ear (e.g., when the user is making a phone call). Proximity sensor 166 may also be used to disable touch screen display 112 when device 100 is not in use, such as for instance, when device 100 is in the user's pocket, purse, or other dark area, to prevent unnecessary battery drainage when device 100 is in a locked state or is otherwise not in use.

Device 100 may also include one or more accelerometers 168. FIG. 1 shows an accelerometer 168 coupled to peripherals interface 118. Alternately, accelerometer 168 may be coupled to an input controller 160 in I/O subsystem 106. Accelerometer 168 generally captures data that is analyzed to determine whether to change a view of information, for example from portrait to landscape, displayed on touch screen display 112 of portable device 100.

The software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

In operation, operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or the external port 124. External port 124 (e.g., Universal Serial Bus (USB), FIREWIRE, etc.) is adapted for coupling directly to other devices or communicating indirectly to other devices over a network (e.g., the Internet, wireless LAN, etc.).

Contact/motion module 130 may detect contact with touch screen display 112 (in conjunction with display controller 156, for instance) and other touch sensitive devices (e.g., a touchpad or physical click wheel). Contact/motion module 130 generally includes various software components for performing various operations related to detection of contact, such as determining if contact has occurred, determining if there is movement of the contact, and tracking the movement across touch screen display 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). Alternatively, contact/motion module 130 and controller 160 may detect contact on a click wheel or other input device, for example.

Graphics module 132 includes various known software components for rendering and displaying graphics on touch screen display 112, including components for changing the intensity of graphics that are displayed. As used herein, the term "graphics" includes any object that can be displayed to a user, including without limitation text, web pages, icons (such as user-interface objects including soft keys), digital images, videos, animations, and the like.

Text input module 134, which may be a component of graphics module 132, provides soft keyboards for entering text in various applications (e.g., contacts 137, e-mail 140, IM 141, blogging 142, browser 147, and any other application that request or require text input).

GPS module 135 determines the location of device 100 and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof: a contacts module 137 (sometimes called an address book or contact list); a telephone module 138; a video conferencing module 139; an e-mail client module 140; an instant messaging (IM) module 141; a blogging module 142; a camera module 143 for still and/or video images; an image management module 144; a video player module 145; a music player module 146; a browser module 147; a calendar module 148; a widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; video and music player module, which merges video player module 145 and music player module 146; notes module; and/or map module; and/or online video module.

Examples of other applications 136 that may be stored in memory 102 include other word processing applications, JAVA-enabled applications, encryption, digital rights management, voice recognition, and voice recognition or voice replication.

In conjunction with touch screen display 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen display 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen display 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen display 112, display controller 156, contact module 130, graphics module 132, and text input module 134, the e-mail client module 140 may be used to create, send, receive, and manage e-mail. In conjunction with image management module 144, e-mail module 140 makes it easy to create and send e-mails with still or video images taken with camera module 143.

In conjunction with RF circuitry 108, touch screen display 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages.

In conjunction with RF circuitry 108, touch screen display 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen display 112, display controller 156, optical sensor(s) 164, optical sensor controller 158, contact module 130, graphics module 132, and image management module 144, the camera module 143 may be used to capture still images or video (including a video stream) and store same into memory 102, modify characteristics of a still image or video, or delete a still image or video from memory 102.

In conjunction with touch screen display 112, display controller 156, contact module 130, graphics module 132, text input module 134, and camera module 143, image management module 144 may be used to arrange, modify or otherwise manipulate, label, delete, present (e.g., in a digital slide show or album), and store still and/or video images.

In conjunction with touch screen display 112, display controller 156, contact module 130, graphics module 132, audio circuitry 110, and speaker 111, the video player module 145 may be used to display, present, or otherwise to play back videos (e.g., on touch screen display 112 or on an external, connected display via external port 124).

In conjunction with touch screen display 112, display system controller 156, contact module 130, graphics module 132, audio circuitry 110, speaker 111, RF circuitry 108, and browser module 147, music player module 146 allows a user to download and play back recorded music and other sound files stored in one or more file formats, such as MP3 or AAC files.

In conjunction with RF circuitry 108, touch screen display 112, display system controller 156, contact module 130, graphics module 132, and text input module 134, browser module 147 may be used to browse the Internet, including searching, linking to, receiving, and displaying web pages or portions thereof, as well as attachments and other files linked to web pages.

In conjunction with RF circuitry 108, touch screen display 112, display system controller 156, contact module 130, graphics module 132, text input module 134, e-mail module 140, and browser module 147, calendar module 148 may be used to create, display, modify, and store calendars and data associated with calendars (e.g., calendar entries, to do lists, etc.).

In conjunction with RF circuitry 108, touch screen display 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). A widget may include an HTML (Hypertext Markup Language) file, a CSS (Cascading Style Sheets) file, and a JavaScript file. A widget may also include an XML (Extensible Markup Language) file and a JavaScript file (e.g., Yahoo! Widgets).

In conjunction with RF circuitry 108, touch screen display 112, display system controller 156, contact module 130, graphics module 132, text input module 134, and browser module 147, widget creator module 150 may be used by a user to create widgets (e.g., turning a user-specified portion of a web page into a widget).

In conjunction with touch screen display 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen display 112, display controller 156, contact module 130, graphics module 132, and text input module 134, a notes module may be used to create and manage notes, to do lists, and the like.

In conjunction with RF circuitry 108, touch screen display 112, display system controller 156, contact module 130, graphics module 132, text input module 134, GPS module 135, and browser module 147, a map module may be used to receive, display, modify, and store maps and data associated with maps (e.g., driving directions; data on stores and other points of interest at or near a particular location; and other location-based data).

In conjunction with touch screen display 112, display system controller 156, contact module 130, graphics module 132, audio circuitry 110, speaker 111, RF circuitry 108, text input module 134, e-mail client module 140, and browser module 147, an online video module allows the user to access, browse, receive (e.g., by streaming and/or download), play back (e.g., on touch screen display 112 or on an external, connected display via external port 124), send an e-mail with a link to a particular online video, and otherwise manage online videos in one or more file formats, such as H.264. In other modes of operation, instant messaging module 141, rather than invoking e-mail client module 140, may be employed to send a link to a particular online video.

It will be appreciated that each of the above identified modules and applications corresponds to a set of instructions for performing one or more functions described above. These modules or applications (i.e., sets of instructions) need not be implemented as separate software programs or procedures, and thus various subsets of these modules may be combined or otherwise re-arranged in various embodiments. For example, video player module 145 may be combined with music player module 146 into a single module or application (e.g., video and music player module). Memory 102 may store a subset of the modules and data structures identified above. Furthermore, memory 102 may store additional modules and data structures not described above.

Device 100 may be embodied in or comprise a device in which operation of a predefined set of functions on the device 100 is performed exclusively through touch screen display 112 and/or a touchpad. By using touch screen display 112 and/or a touchpad as the primary input/control device for operation of device 100, the number of physical input/control devices (such as push buttons, dials, and the like) on device 100 may be reduced.

Figure 2:
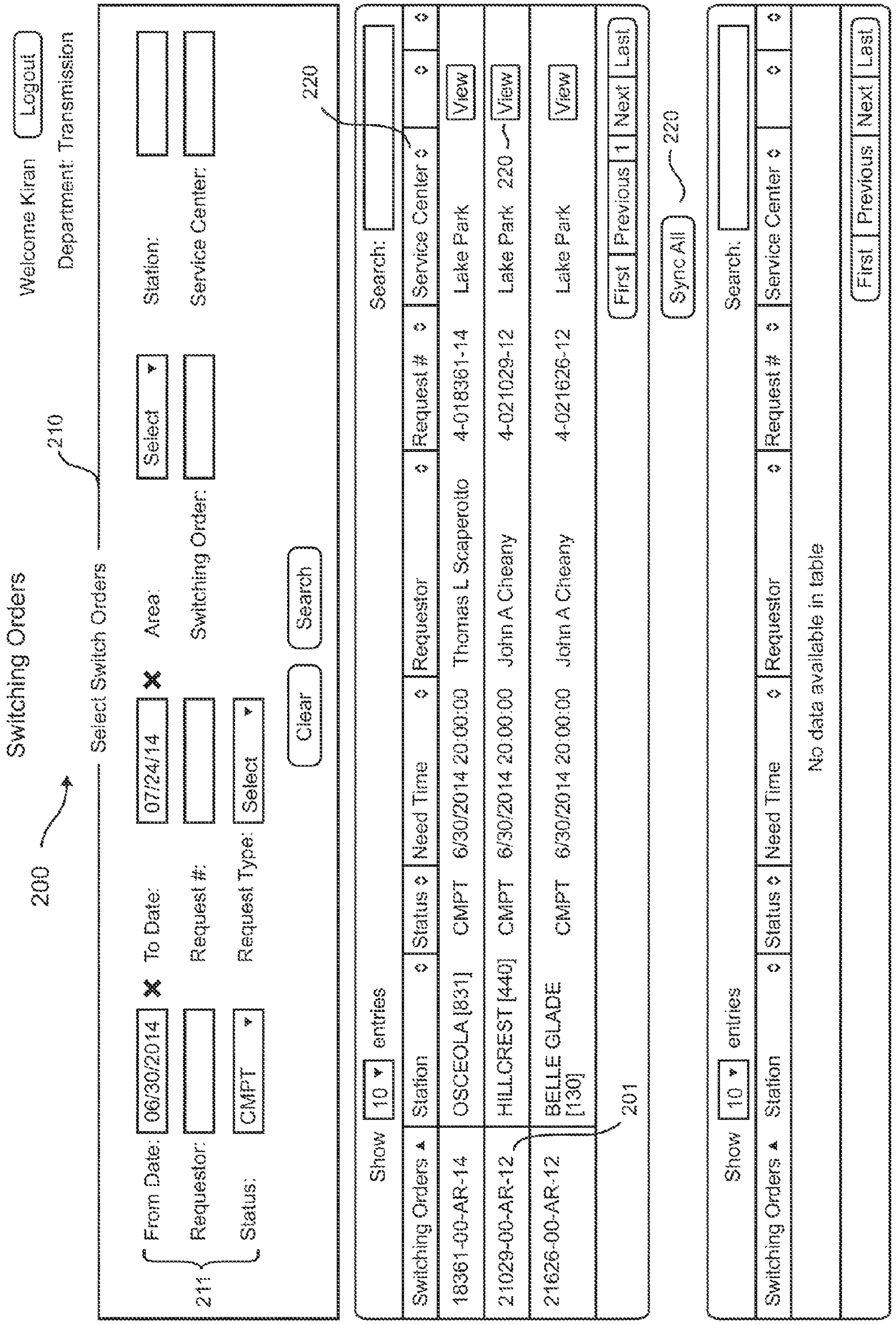
FIG. 2 illustrates a user interface for searching for a switch order in accordance with an embodiment.

FIG. 2 illustrates a user interface for searching for a switch order in accordance with an embodiment. During use, the user interface 200 depicted in FIG. 2 may be displayed on touch screen display 112 as described above with reference to FIG. 1. As indicated in FIG. 2, a user of device 100 may search for available switching orders 201 to view; these may be local switching orders (e.g., stored locally on device 100) or they may be switching orders received or downloaded from a remote location (e.g., via RF circuitry 108 in cooperation with telephone module 138, e-mail client module 140, or some other component of device 100). The user may enter or select search criteria to search for switching orders, for example, using a search interface 210 or similar user interface construct. Prior to searching, the user may fill out the search criteria fields (reference numeral 211) displayed as follows:

From Date—enter the date (MM/DD/YYYY) to search for switching orders entered after the specified date.

To Date—enter a date (MM/DD/YYYY) to search for switching orders entered prior to the specified date.

Area—choose a geographical location, for example, a state, city, or county.

Station—enter a specific substation name or identification number.

Requestor—enter a name of an individual associated with a switching request.

Request #—enter a number associated with the switching request.

Switching Order—enter a numerical or alphabetical designation or identifier associated with a switching order.

Status—choose a switching order status.

Request type—choose a type of switching request.

After performing the search, the user may arrange or organize returned results in accordance with, for example, switching order designation or identifier, desired or required completion date or time, relevant station, status, or other criteria 211 that are noted above or otherwise relevant to a particular switching order. Using operative buttons or other mechanisms 220 associated with user interface 200, the user may also view a selected switching order or synchronize, order, prioritize, or summarize all of the displayed switching orders.

Figure 3:
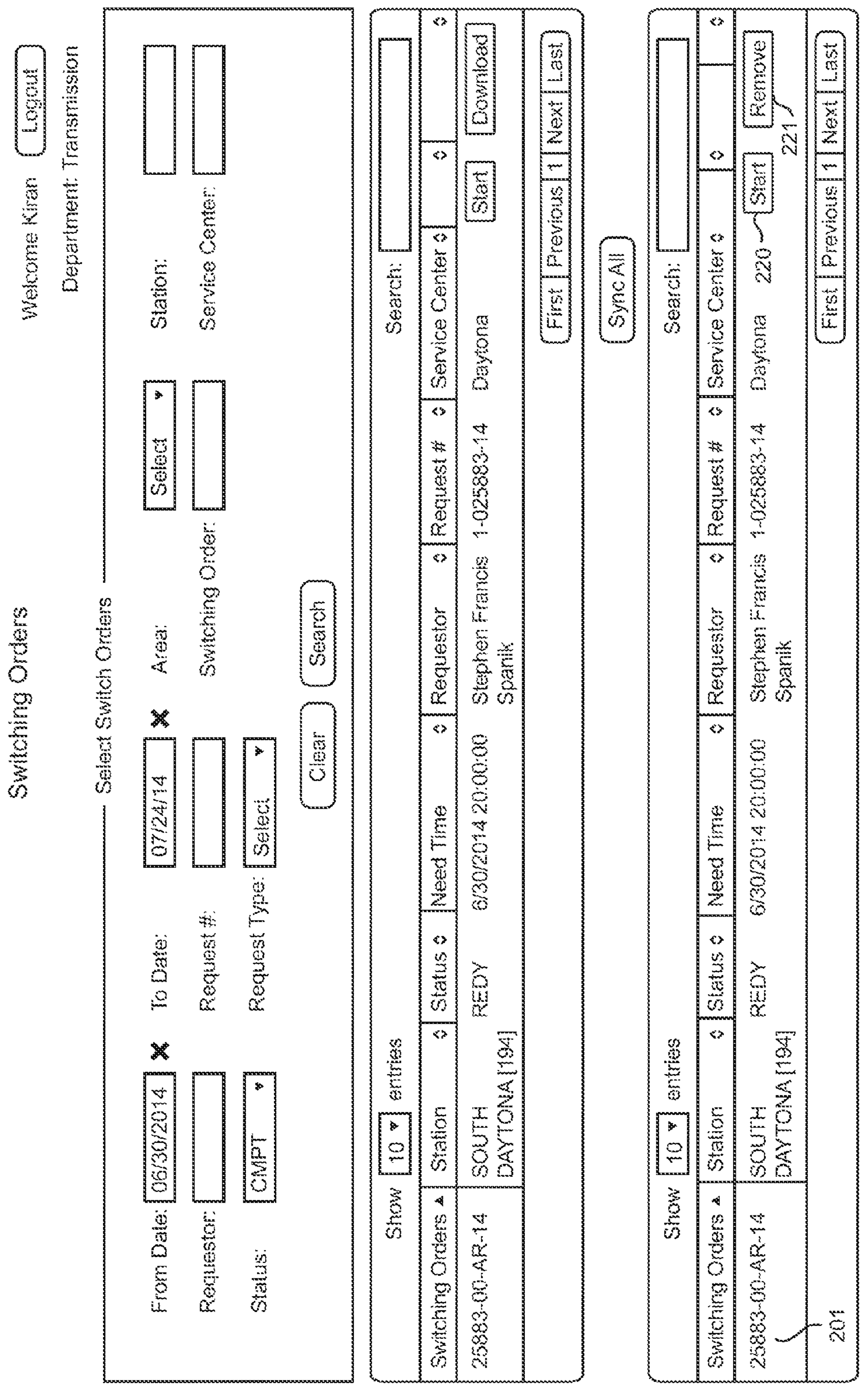
FIG. 3 illustrates a user interface for searching for a switch order in accordance with another embodiment.

FIG. 3 illustrates a user interface for searching for a switch order in accordance with another embodiment. After opting to view a particular switching order 201, a user of device 100 may select a start button or other user interface mechanism 220 to display switching steps or procedural requirements for executing a switching order. The user may also download the switching order to place the switching order in a separate table, queue, or other data structure, e.g. to be tagged or identified for execution at a later time. The user may further remove (reference numeral 221) a downloaded switching order or identify it as having been canceled or completed, for example.

Figure 4:
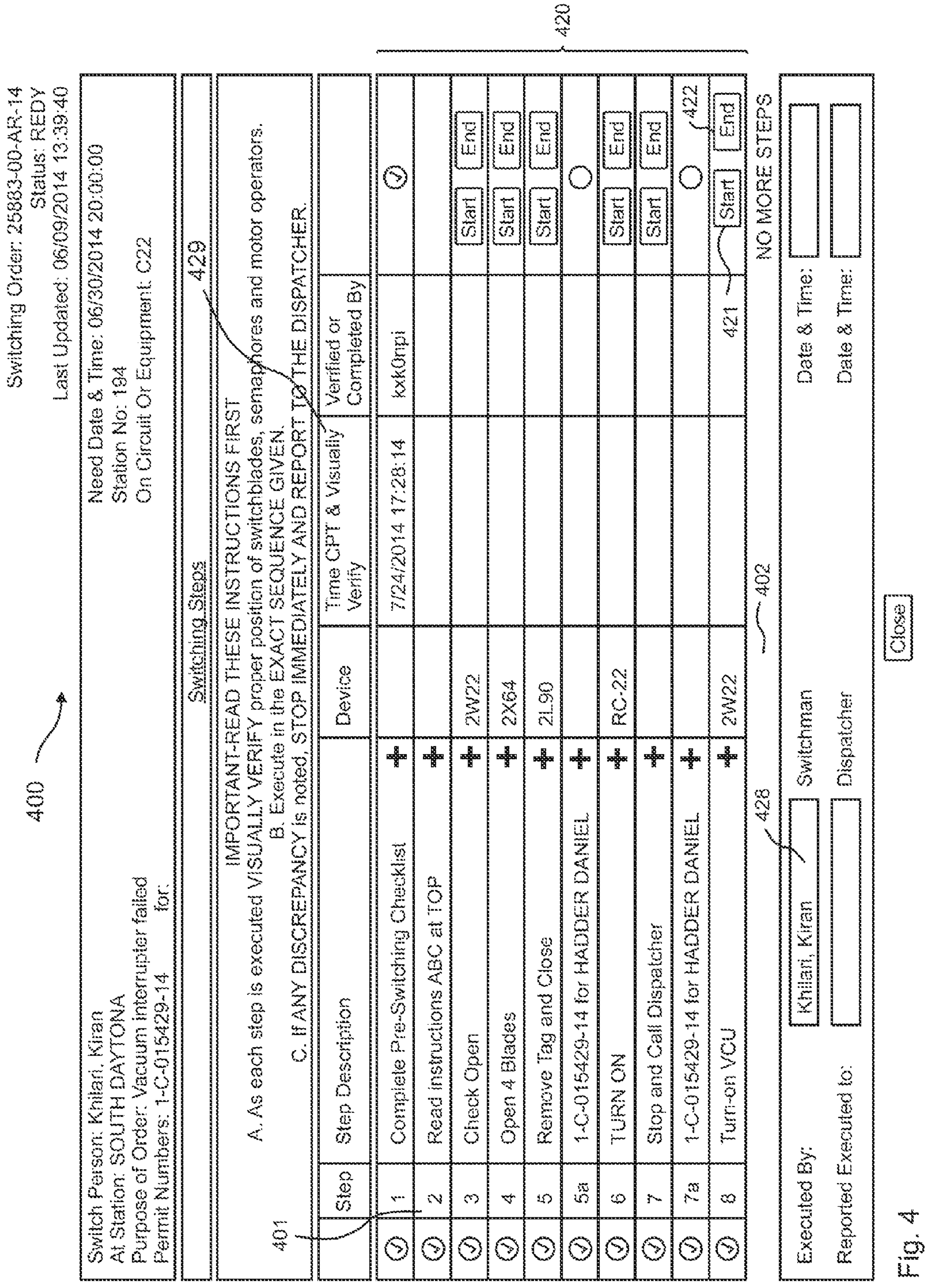
FIG. 4 illustrates a user interface for executing a switching order in accordance with an embodiment.

FIG. 4 illustrates a user interface for executing a switching order in accordance with an embodiment. As indicated in FIG. 4, a user interface 400 may display a list of steps, routines, or procedural elements 401, as well as devices or components 402 associated with each step, if any, that are necessary, prudent, desirable, or otherwise related to executing a switching order. Check boxes, radio buttons, fillable bubbles, or other user interface mechanisms or indicia 420 may be associated with each step. In some implementations, the check boxes or bubbles may be manually checked by a user of device 100; additionally or alternatively, such user interface constructs may be modified automatically by the relevant application running on device 100 upon completion or successful execution of a specified event. For example, the user may select (or check) a "start" or "begin" button or check box 421 when beginning a particular step, and may select an "end" or "completed" button 422 when completing a particular step; alternatively, where the application running on device 100 is suitably configured, the "end" button 422 may be selected automatically when the application determines that the step or procedure 401 has been executed. As another example, a time entry or time stamp representative of a start time or an end time for a particular step may be manually or automatically populated to the list (as illustrated by reference numeral 429 near the center of FIG. 4) upon starting or completing a step. A name field 428 for the individual starting or completing a step also may be manually or automatically populated to the list. In some embodiments, only a portion of the list (i.e., representing a subset of the steps or procedures 401 associated with the switching order) may be displayed at a given time on touch sensitive display 112; in such instances, a user may scroll up or down through the list to display other steps or procedures 401 that are not currently displayed. Some portions of the list may not be scrollable or otherwise viewable; for instance, it may be desirable to prevent a user from seeing certain switching order steps or procedures 401 until certain other steps or procedures 401 have been successfully completed. In these situations, scrolling may be unlocked, for example, allowing a user to view or otherwise access data that were previously not viewable, upon successful completion of a prerequisite step 401 or upon satisfying some other suitable criteria.

In that regard, some embodiments may prevent or forbid a user from starting or ending a particular step 401 until a previous step 401 is completed or some other criterion is satisfied. A user may also open a separate checklist, procedural guidelines, or other step-wise instructions associated with a particular switching order step 401. For example, a pre-switching checklist or a verification checklist, may be displayed to the user which sets forth step-wise instructions that must be separately executed, in order, prior to completion of the associated switching order step 401.

Figure 5:
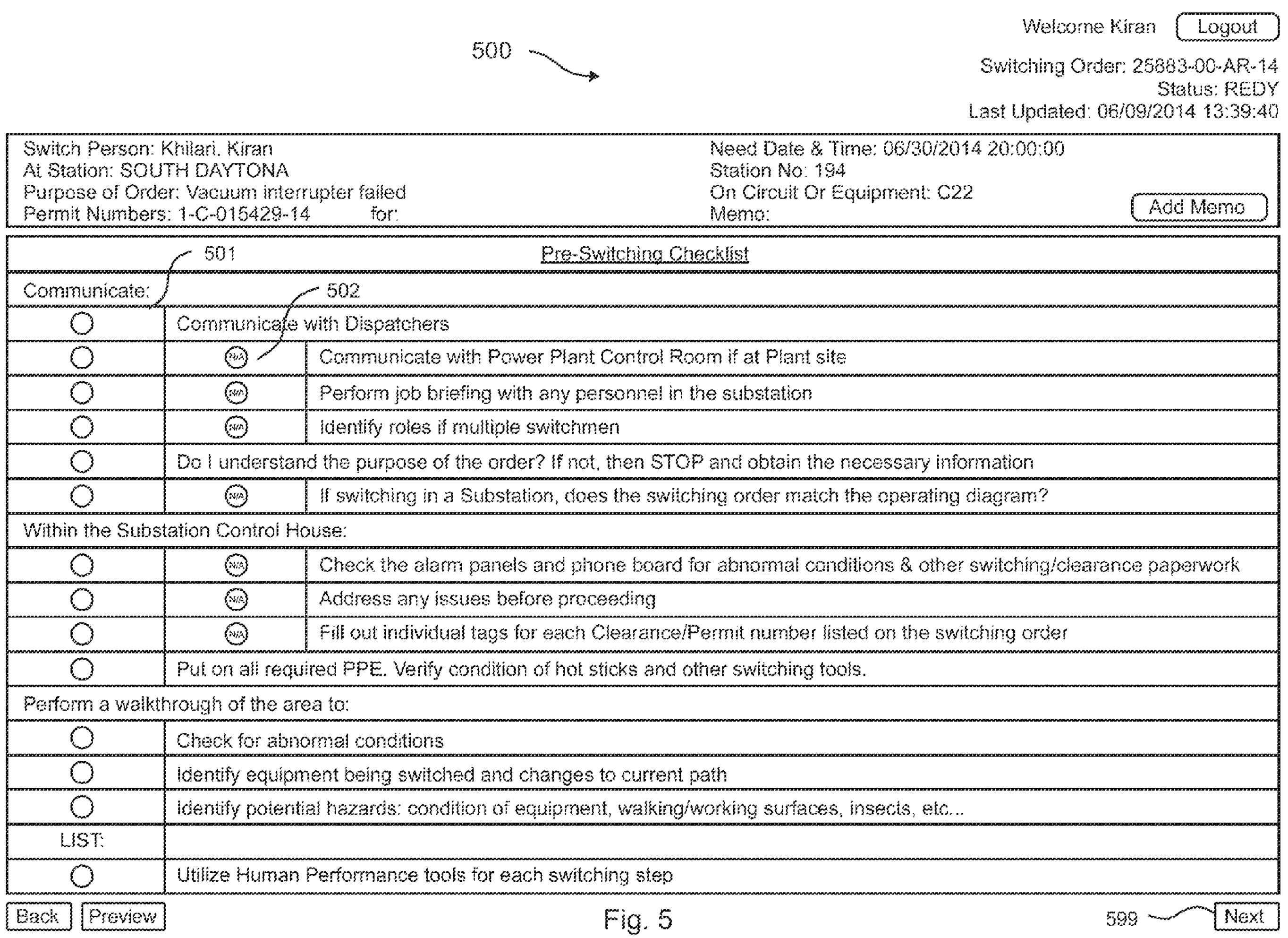
FIG. 5 illustrates a user interface for a pre-service, or pre-switching, checklist in accordance with an embodiment.

FIG. 5 illustrates a user interface for a pre-service, or pre-switching, checklist. The user may access the pre-switching checklist 500 through a switching steps list such as illustrated in FIG. 4 and described above. The pre-switching checklist 500 may provide steps or specific procedures for a user (in this example, switching personnel) to complete prior to starting other steps provided on the switching steps list. The user may fill check bubbles or boxes 501 associated with each step upon completion of the steps. The user may also fill "Not-Applicable" check bubbles 502 for steps that are not applicable to a particular switching order. Upon completion of steps displayed in the pre-switching checklist, the user may select a "next" button 599. The check bubble or box 420 on the switching order list checklist associated with pre-switching procedures (see step 1 in FIG. 4) may be auto-filled upon completion of the pre-switching checklist 500.

Figure 6:
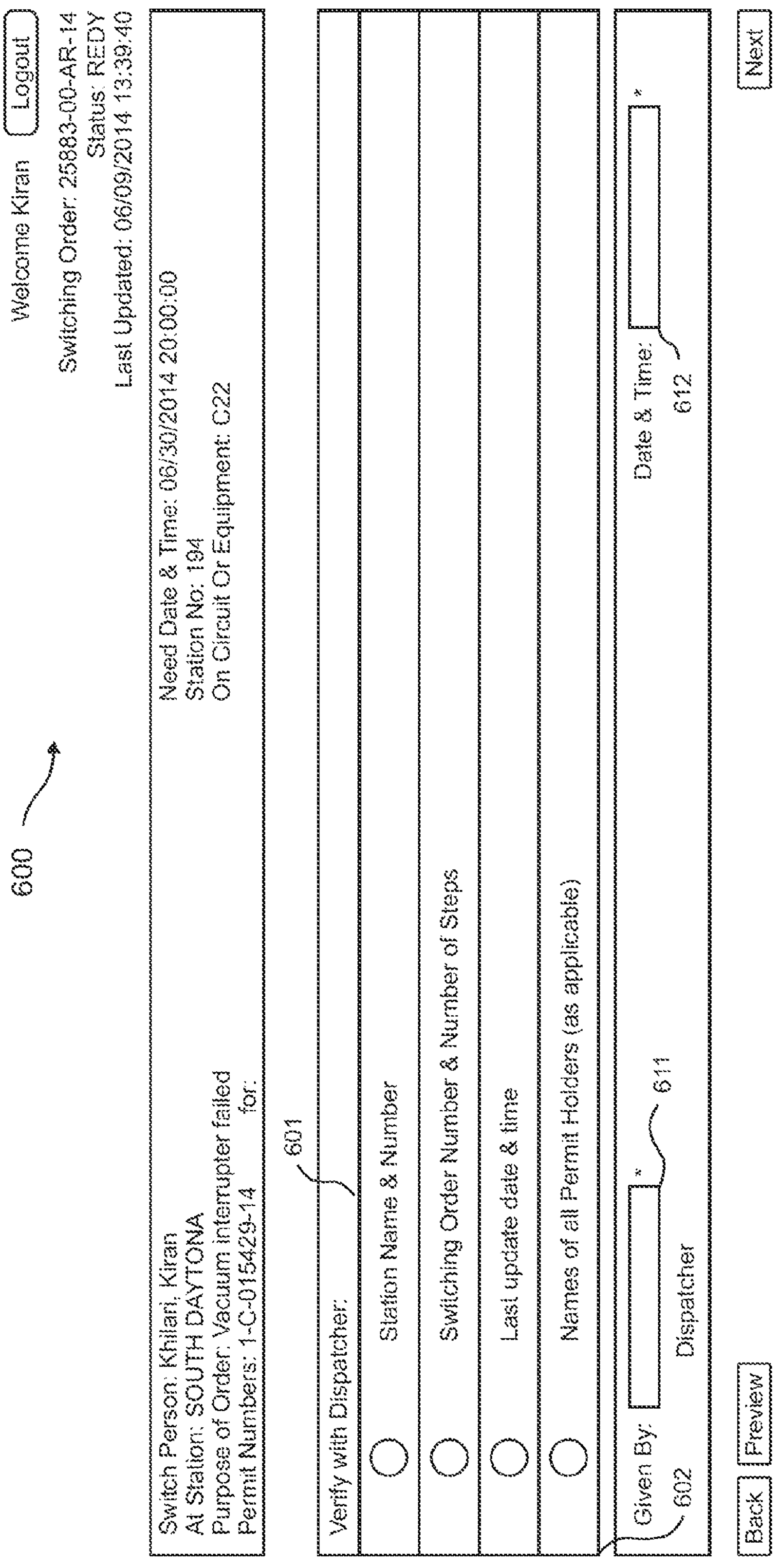
FIG. 6 illustrates a user interface for a verification checklist in accordance with an embodiment.

FIG. 6 illustrates a user interface for a verification checklist. In some embodiments, a user may complete a verification checklist 600 to verify completion of each step (401 such as illustrated in FIG. 4) of the switching order being executed. The user may also complete a verification checklist 600 such as that illustrated in FIG. 6 to verify completion of an entire switching order (i.e., all the relevant or applicable steps). During verification procedures, the user may select or fill check bubbles or boxes 602, each of which is associated with a particular step 601 of the verification checklist 600. In the FIG. 6 embodiment, a dispatcher name 611 and a date and time of completion 612 may be entered in respective fields of the verification checklist; it will be appreciated that these fields may be pre-filled or auto-populated in some embodiments.

Figure 7A:
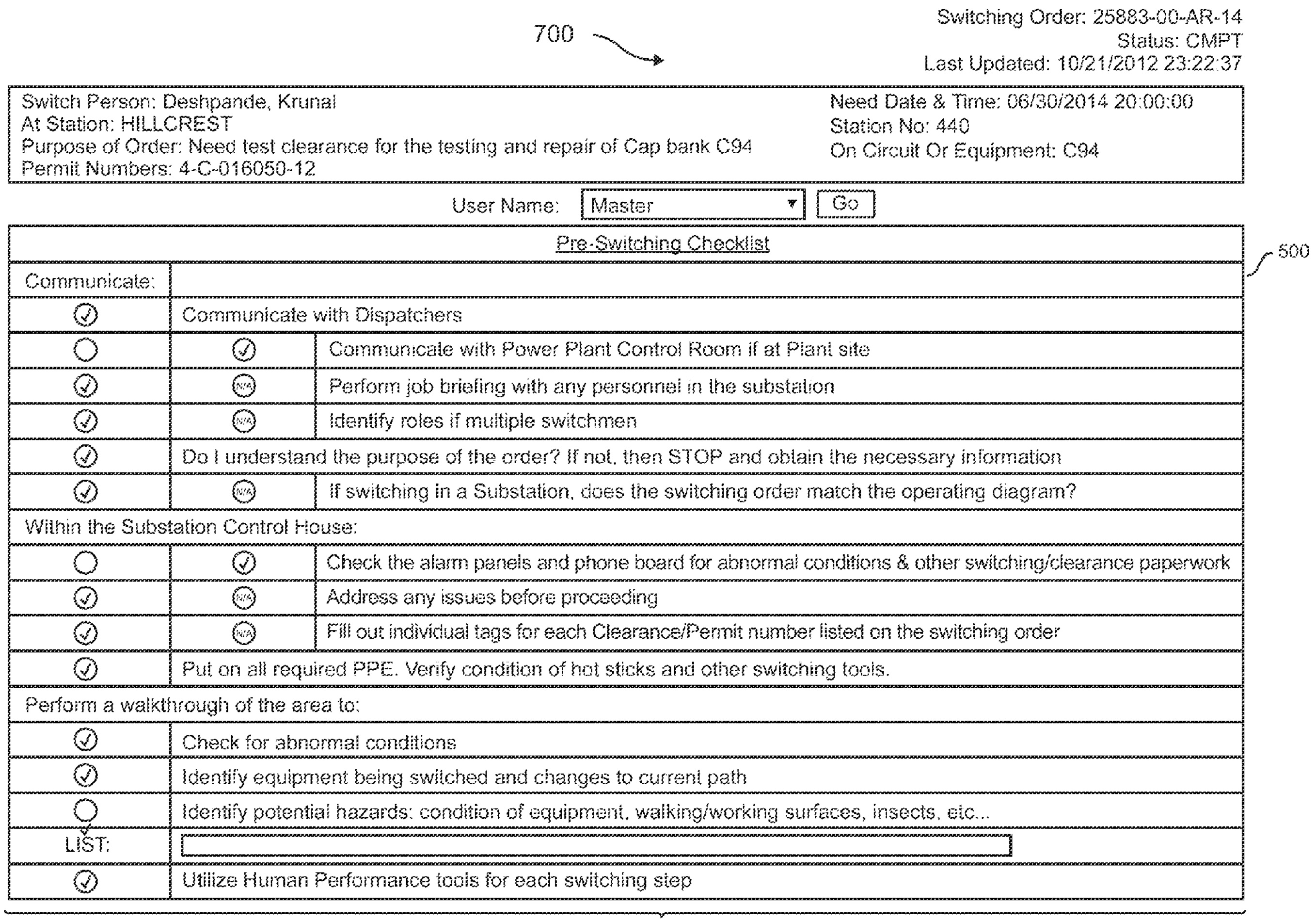
Figure 7B:
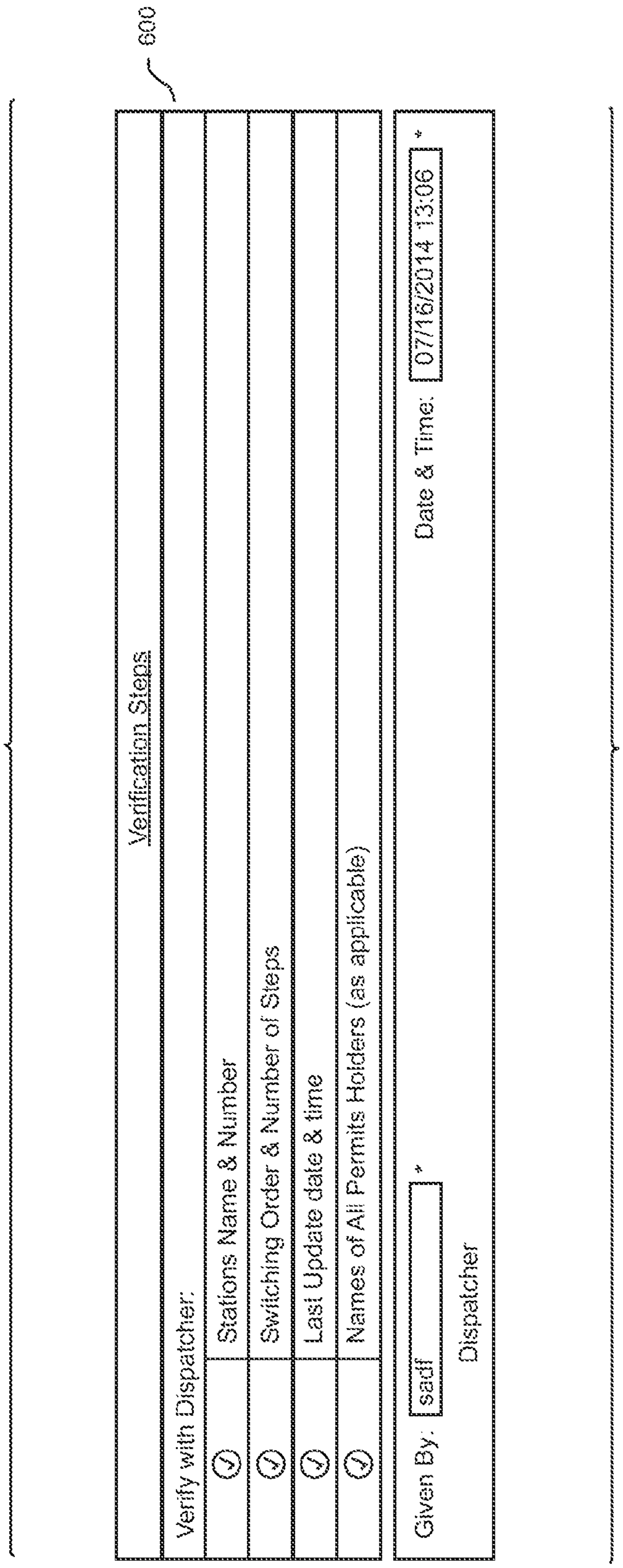

FIGS. 7A-7C illustrate a user interface for a multi-switchman view. It will be appreciated that the user interface 700 may have utility when multiple switching personnel are collaborating on the same switching order. In such instances, the particular display depicted on touch sensitive display 112 of device 100, for example, may differ for each particular collaborator depending, for example, upon the role each person plays and the steps of the switching operation that each person is to complete. In some embodiments, a user (such as a supervisor or administrator, for example) may view pre-switching checklists 500, verification checklists 600, switching steps 401, or a combination of these and other relevant information, for some or all of the individuals executing a particular switching order.

Figure 8:
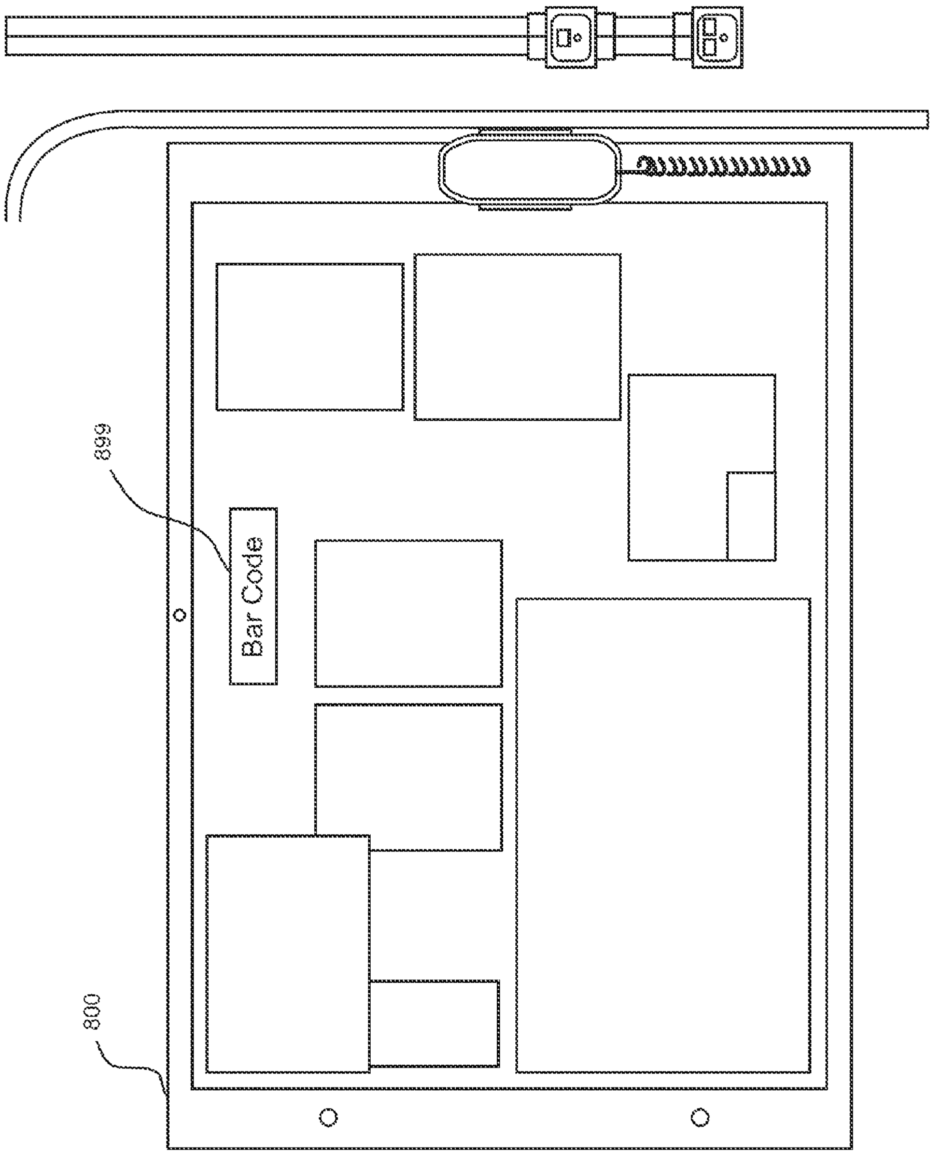
FIG. 8 illustrates a relay vault telephone board with a barcode according to an embodiment.

In accordance with some embodiments, a user may interact with the application running on device 100 (e.g., to verify the start or completion of a step of a switching order) by scanning a barcode or other visible indicia, for example, displayed on substation equipment associated with a particular step. It will be appreciated that RF identification tags or other wireless communication paradigms may also be used for this purpose, as opposed to visible or optical indicia. FIG. 8 illustrates a relay vault telephone board with a barcode according to an embodiment.

During execution of a switching order as described above, a user may scan or enter a barcode 899 displayed in the substation, for example, on the relay vault telephone board 800 or other switching component or apparatus, to verify a station number.

Figure 9:
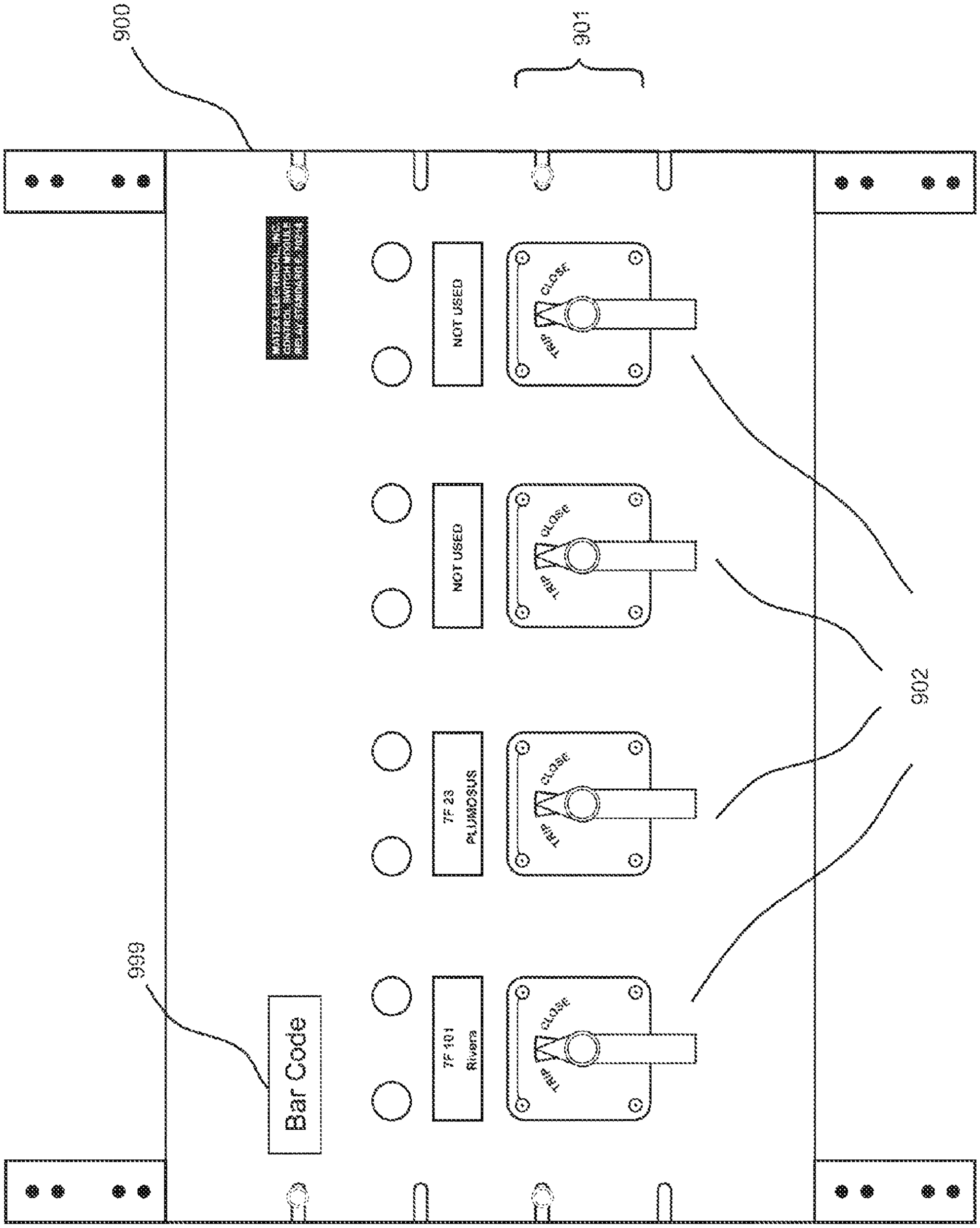
FIG. 9 illustrates a line switch control panel with a barcode according to an embodiment.

FIG. 9 illustrates a line switch control panel with a barcode according to an embodiment. After a user has verified the substation at which the switching order is to be executed, the user may scan a barcode 999 (displayed, for example, on a line switch control panel 900 as depicted in FIG. 9). In this example, each line or designated electrical component 901 may have a unique barcode or other identifying indicia; alternatively, a single barcode 999 may be used for the entire control panel 900. In accordance with the switching order, a user may open the designated line using an associated line control knob, dial, rocker panel, or other device 902 generally known in the art and disposed on the line switch control panel 900 as illustrated in FIG. 9.

Figure 10:
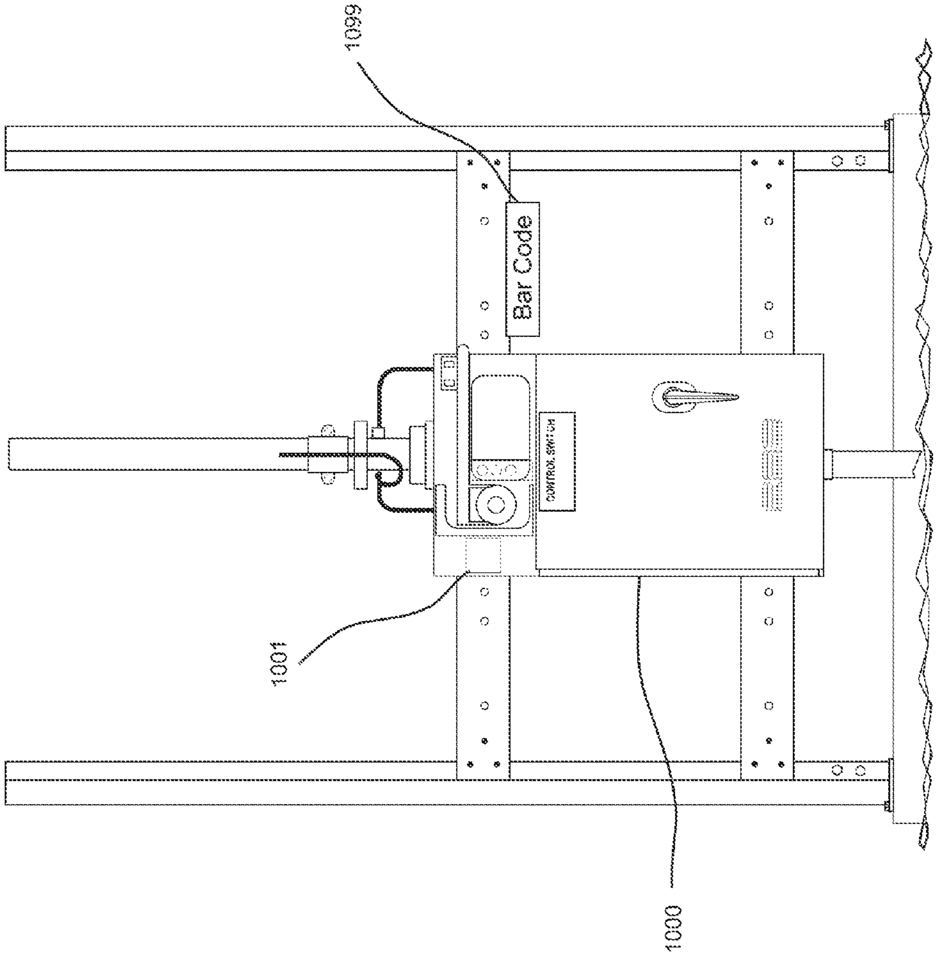
FIG. 10 illustrates a line switch with a barcode according to an embodiment.

FIG. 10 illustrates a line switch with a barcode according to an embodiment. After the user has opened the designated line, the user may verify that the designated line has been opened by scanning a barcode 1099 at the designated line switch 1000. The user may verify the position of switchblades or semaphores 1001 at the switch 1000.

Figure 11:
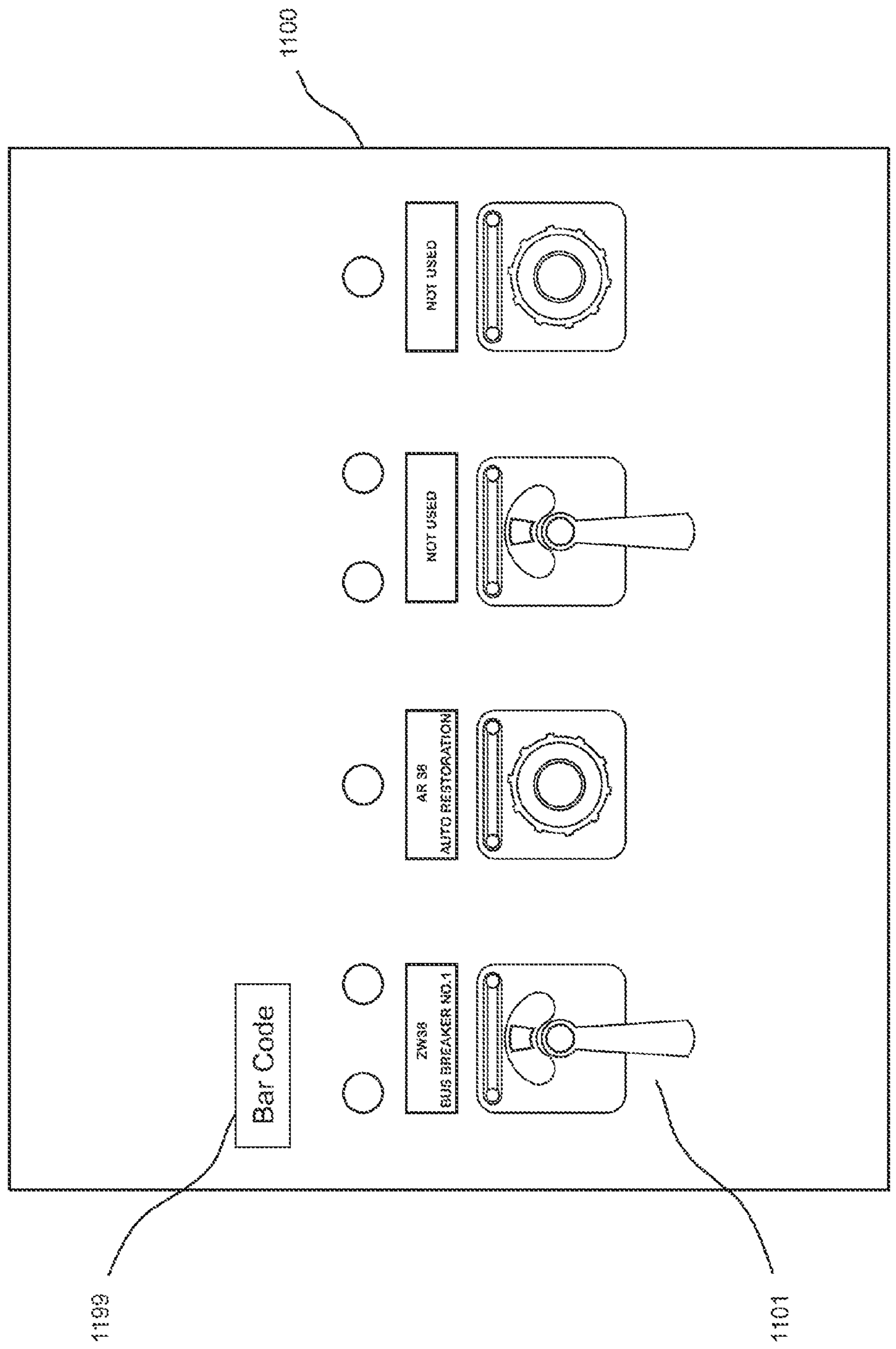
FIG. 11 illustrates a bus tie breaker control panel with a barcode according to an embodiment.

FIG. 11 illustrates a bus tie breaker control panel with a barcode according to an embodiment. As specified by a switching order, after a user has verified that the designated line has been opened, the user may close the designated bus tie breaker. As contemplated herein, the user may scan a barcode 1199 displayed, for example, on a bus tie breaker control panel (1100 as illustrated in FIG. 11) and then close the designated bus tie breaker through an associated bus tie breaker control knob, dial, rocker panel, or the like 1101.

Figure 12:
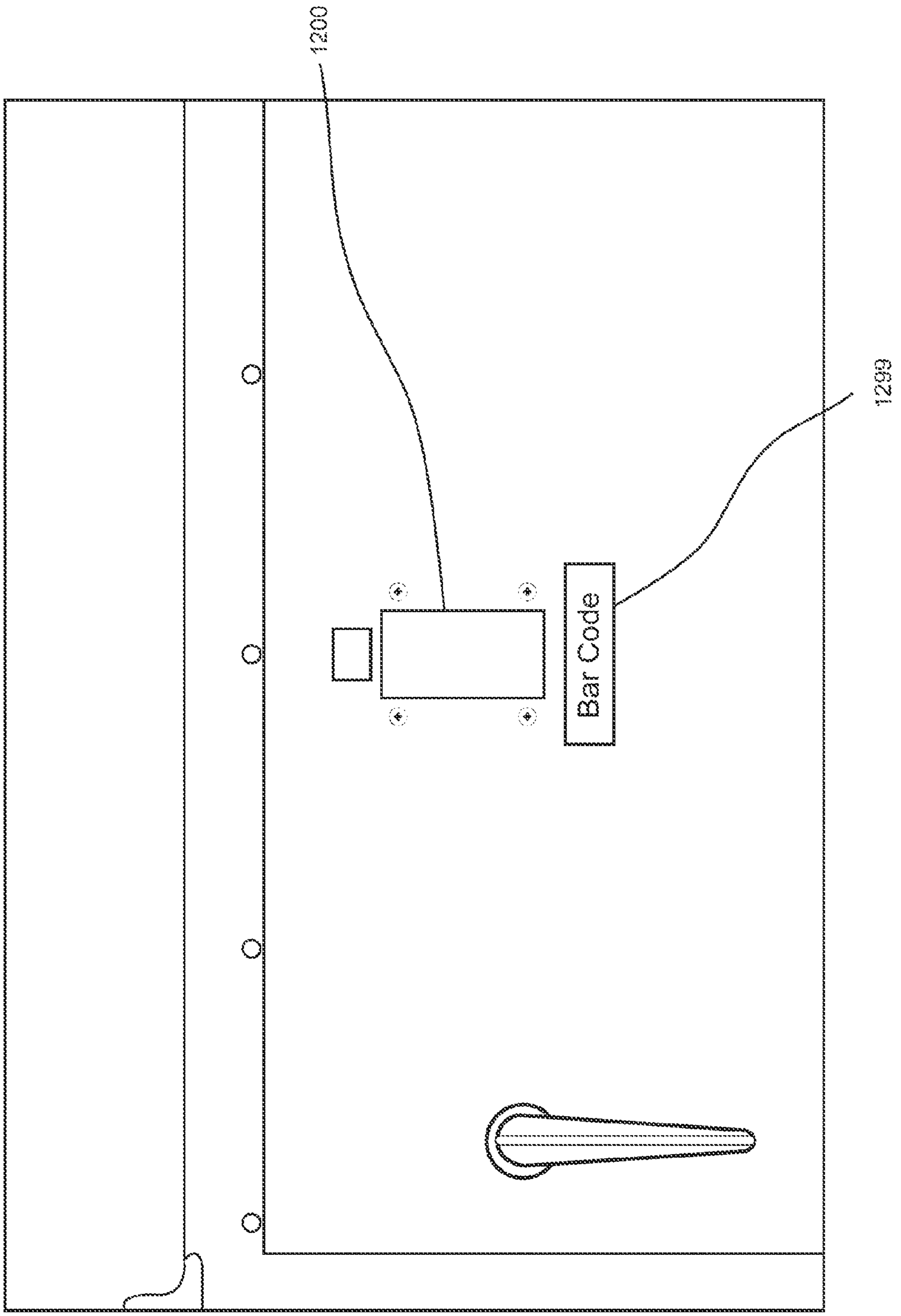
FIG. 12 illustrates a bus tie breaker with a barcode according to an embodiment.

FIG. 12 illustrates a bus tie breaker with a barcode according to an embodiment. After the user has closed the bus tie breaker control, the user may verify that a breaker semaphore for the corresponding bus tie breaker is closed by scanning a barcode 1299 displayed, for example, on the bus tie breaker 1200.

Figure 13:
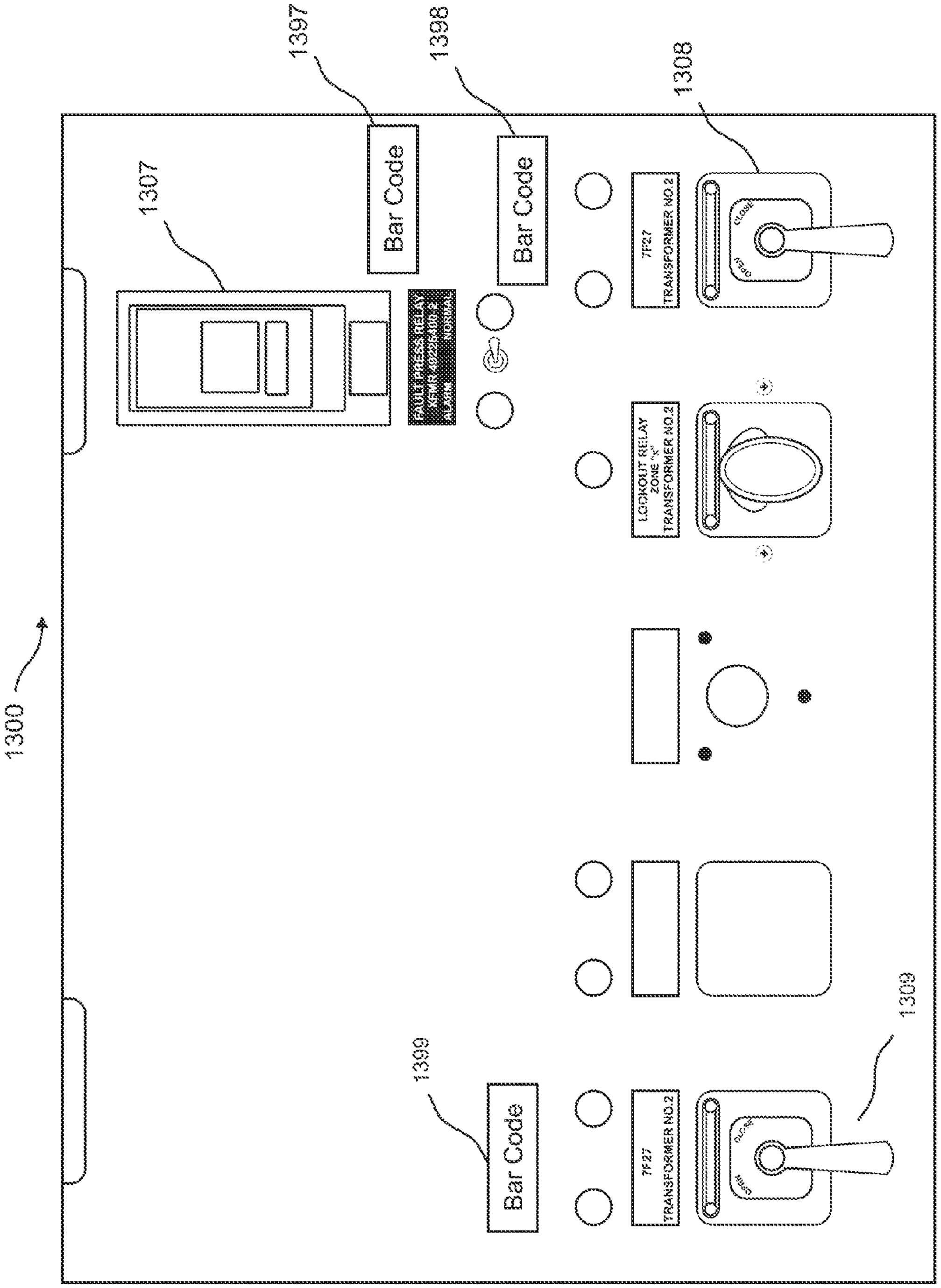
FIG. 13 illustrates a distribution transformer control panel with barcodes according to an embodiment.

FIG. 13 illustrates a distribution transformer control panel with barcodes according to an embodiment. After a user has verified that a bus tie breaker has closed, the user may open a designated transformer. The user may, for example, scan a barcode 1399 for the designated transformer displayed on, for example, a distribution transformer control panel 1300 as illustrated in FIG. 13. A distribution control panel 1300 such as illustrated may generally include an F control 1309, a GB control 1308, and a Fault Pressure Relay (FPR) control 1307. Barcodes for the GB control and FPR control (reference numerals 1398 and 1397, respectively) may also be displayed on the distribution transformer control panel 1300. The user may activate the F control 1309 to open the transformer. It will be appreciated that the present disclosure is not to be interpreted in any limited sense based upon the nature or operating characteristics of the transformer control panel.

Figure 14:
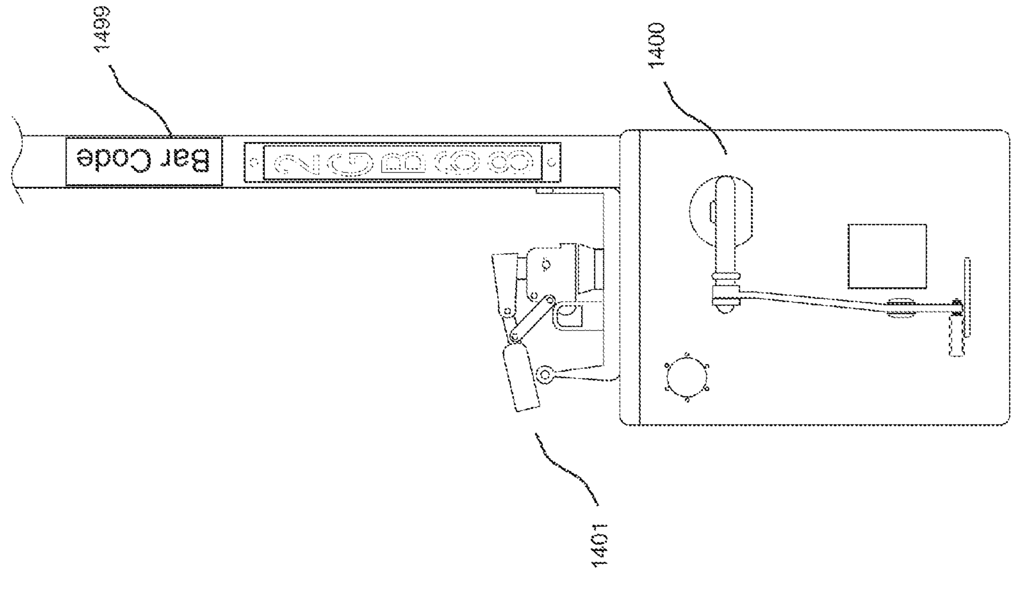
FIG. 14 illustrates a transformer disconnect switch with a barcode according to an embodiment.

FIG. 14 illustrates a transformer disconnect switch with a barcode according to an embodiment. After a user has activated the F control to open the transformer, the user may verify that the corresponding transformer is open. The user may, for example, optically verify that switchblades 1401 located on the transformer disconnect switch 1400 are in an open position. The user may also scan a barcode 1499 displayed on or near the designated transformer disconnect switch 1400 indicating the verification of the transformer.

Figure 15:
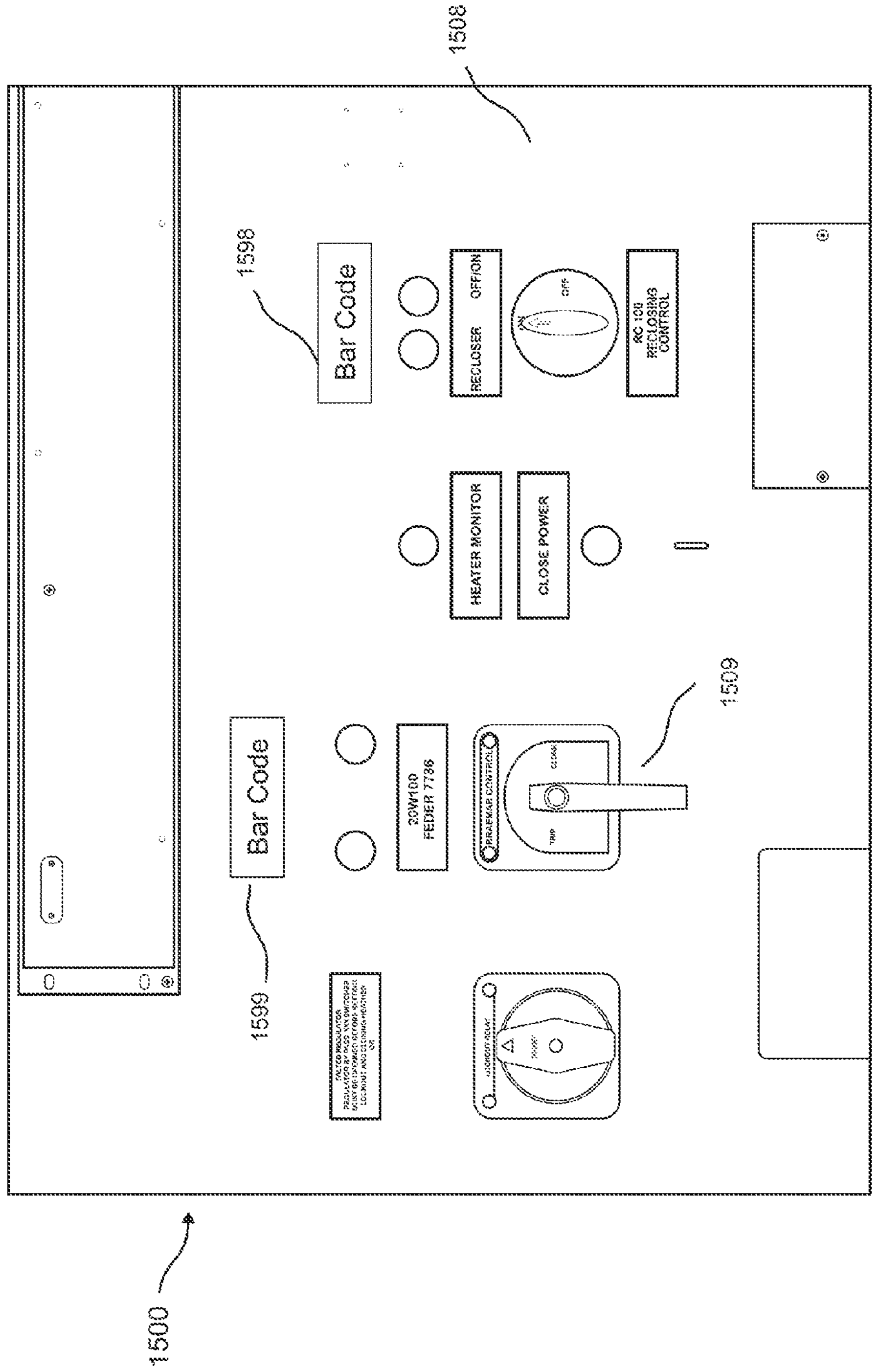
FIG. 15 illustrates a feeder breaker control panel with a barcode according to an embodiment.

FIG. 15 illustrates a feeder breaker control panel with a barcode according to an embodiment. After a user has verified that the transformer is open, the user may open a feeder breaker. The user may, for example, scan a barcode for the feeder breaker displayed on, for example, a feeder breaker control panel 1500. The feeder breaker control panel 1500 may include a feeder breaker control 1509 and a recloser control 1508. Barcodes for the feeder breaker control and recloser control (reference numerals 1599 and 1598, respectively) may also be displayed on the feeder breaker control panel 1500. The user may activate the feeder breaker control 1509 to open the corresponding feeder breaker as is generally known.

Figure 16:
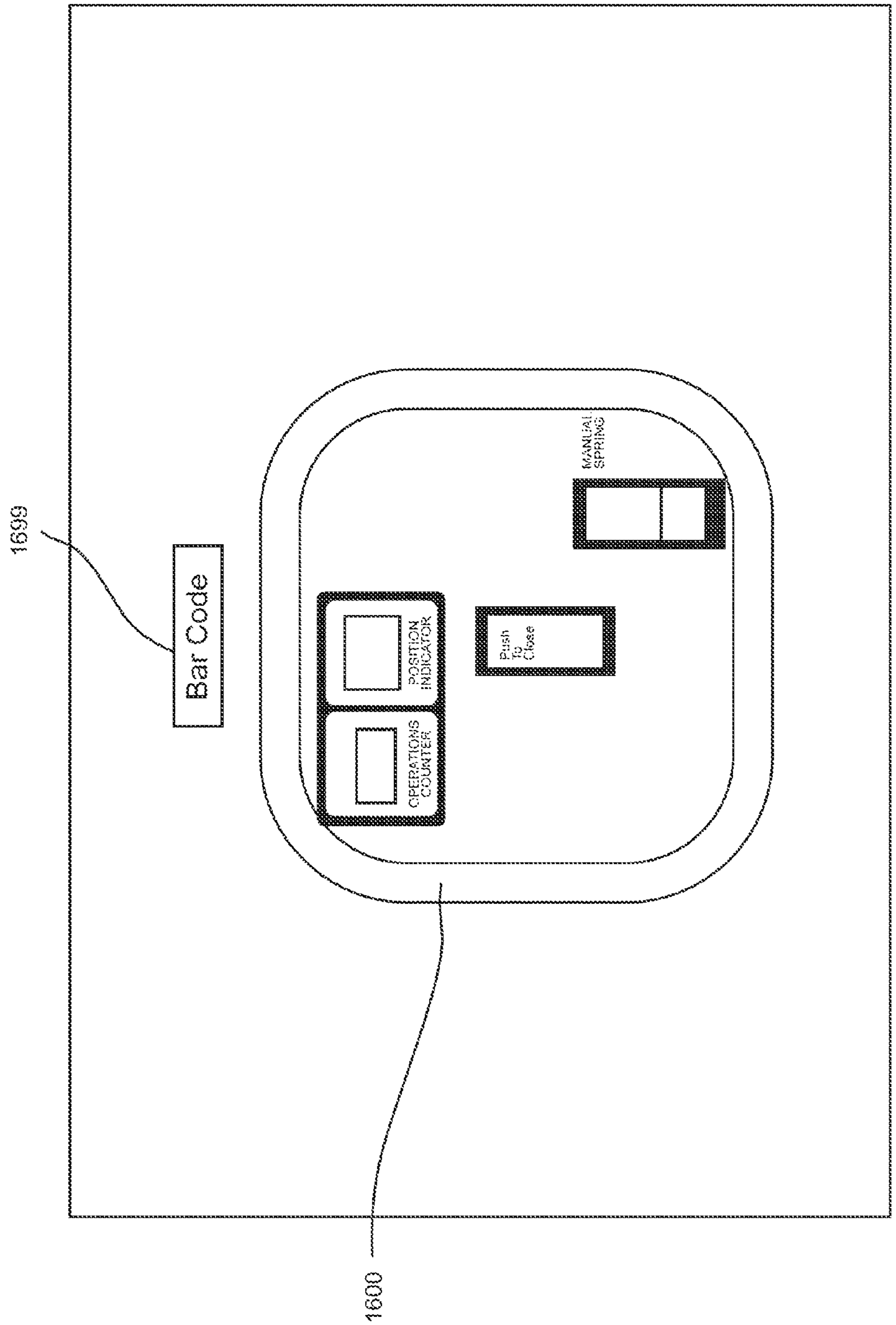
FIG. 16 illustrates a feeder breaker cabinet with a barcode according to an embodiment.

FIG. 16 illustrates a feeder breaker cabinet with a barcode according to an embodiment. After a user opens the feeder breaker, the user may verify that the feeder breaker is open. The user may, for example, optically verify that a feeder breaker semaphore for the feeder breaker is open. The user may scan a barcode 1699 displayed on the feeder breaker cabinet 1600.

Figure 17:
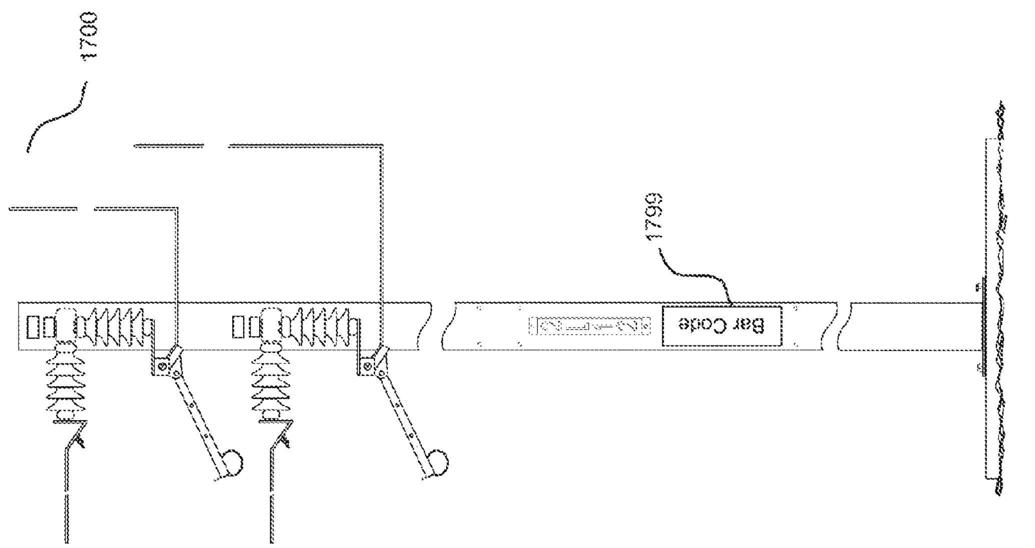
FIG. 17 illustrates a disconnect switch with a barcode according to an embodiment.

FIG. 17 illustrates a disconnect switch with a barcode according to an embodiment. After a user has verified that the feeder breaker is open, the user may close the disconnect switch. The user may, for example, scan a barcode 1799 displayed on the disconnect switch 1700. The user may then remove a tag and close the disconnect switch 1700. The user may then perform a second scan of the barcode 1799 to confirm that the disconnect switch 1700 has been closed. In some embodiments, there may be a time delay requirement between the first and second scan of the barcode 1799.

It will be appreciated that the foregoing description is not intended to be limited by the type, nature, size, or location of the barcodes that are affixed to, integrated with, or otherwise associated with any of the various components in an electric power transmission and distribution system. For example, the barcodes may be embodied in a conventional or a two-dimensional barcode. Similarly, it may be desirable to use a type of two-dimensional array generally referred to as a matrix barcode or QR code. In some instances, text (i.e., numerical or alphabetical characters) labels may be deployed on or in conjunction with certain components; in this case, an application running on device 100 may use optical character recognition (OCR) technologies to convert an image of the label into data that are useable by modules resident on device 100.

Alternatively, non-visual or non-optical identification mechanisms may be employed in some cases. For example, rather than a barcode, some or all of the components identified above may be equipped with magnetic strips, RF identification tags, short range radio transceivers such as Bluetooth-enabled devices, and the like, and may also be located precisely in three-dimensional space using global positioning system (GPS) coordinates. In these instances, rather than using camera module 143 to image a barcode or other visual indicia, a user of device 100 may employ RF circuitry 108 to communicate with a transceiver or passive element (such as magnetic strip) embedded in, attached or affixed to, integrated with, or otherwise associated with a component such as illustrated and described above with reference to FIGS. 8-17.

It will also be appreciated that scanning a barcode or otherwise acquiring data associated with a particular component may be useful not just in identifying the component or verifying that the proper component is being worked on in a particular switching step, but also in terms of providing time stamps and identifying the beginning or ending of process steps. For example, when an application running on device 100 receives a barcode scan or data acquired from an RF identification tag, for instance, the application may time stamp the input and associate that time with the beginning or the completion of the particular switching step as the circumstances suggest.

In light of the foregoing, those of skill in the art will appreciate that the various embodiments set forth herein may include some or all of the following features:

Barcode based Switching: the disclosed systems and methods may use GPS, barcodes, RF signals, or other electronic technologies to identify a location of a substation at which a switching operation is to occur. At the substation location, a device camera or other optical reading apparatus may be used to scan a barcode or other visible indicia to confirm that the correct device or component is being switched before progressing to the next step in the switching order. RF identification, magnetic striping, and other technologies may also be used.

Offline Capability: the disclosed systems and methods may allow switching personnel to perform switching in situations where network connectivity to Outage and Switching Management resources is not available and the only viable option is to use an offline, or local, copy of relevant switching procedures. In some embodiments, features may allow switching personnel to download a copy (i.e., create a local copy) of a switching order to a tablet or laptop (or other portable, multifunction device) and perform switching offline using the local copy of applicable steps or procedures.

Data Validation: the disclosed systems and methods may ensure that switching order steps are followed in proper sequential order. Features may also record the start and end times of a particular switching step, or remind the operator to utilize Stop Think Act Review (STAR) methodologies in performing a step in the switching procedure. In some embodiments, this validation may be effectuated by data acquired by a barcode or RF identification scan.

Adaptive Validation: embodiments of the disclosed systems and methods may work with an Asset Management database or other data storage paradigm to ensure that the correct equipment is switched; features may perform a number of scans and validate that a procedure step has been completed successfully based upon the type of equipment switched during the step. Again, these scans may include barcode scans or may employ RF communication as set forth above.

Collaboration: if multiple people are scheduled to perform steps in a switching procedure, the disclosed systems and methods may coordinate switching step assignments, each of which may be displayed to one or more users, particularly a supervisor, manager, or administrator.

Data Collection and Upload: the disclosed systems and methods collect and record data concerning execution of each switching step; data such as date and time, personnel involved, reassignment of steps, equipment employed, problems or challenges encountered, and the like, may be used for subsequent analysis.

Figure 19:
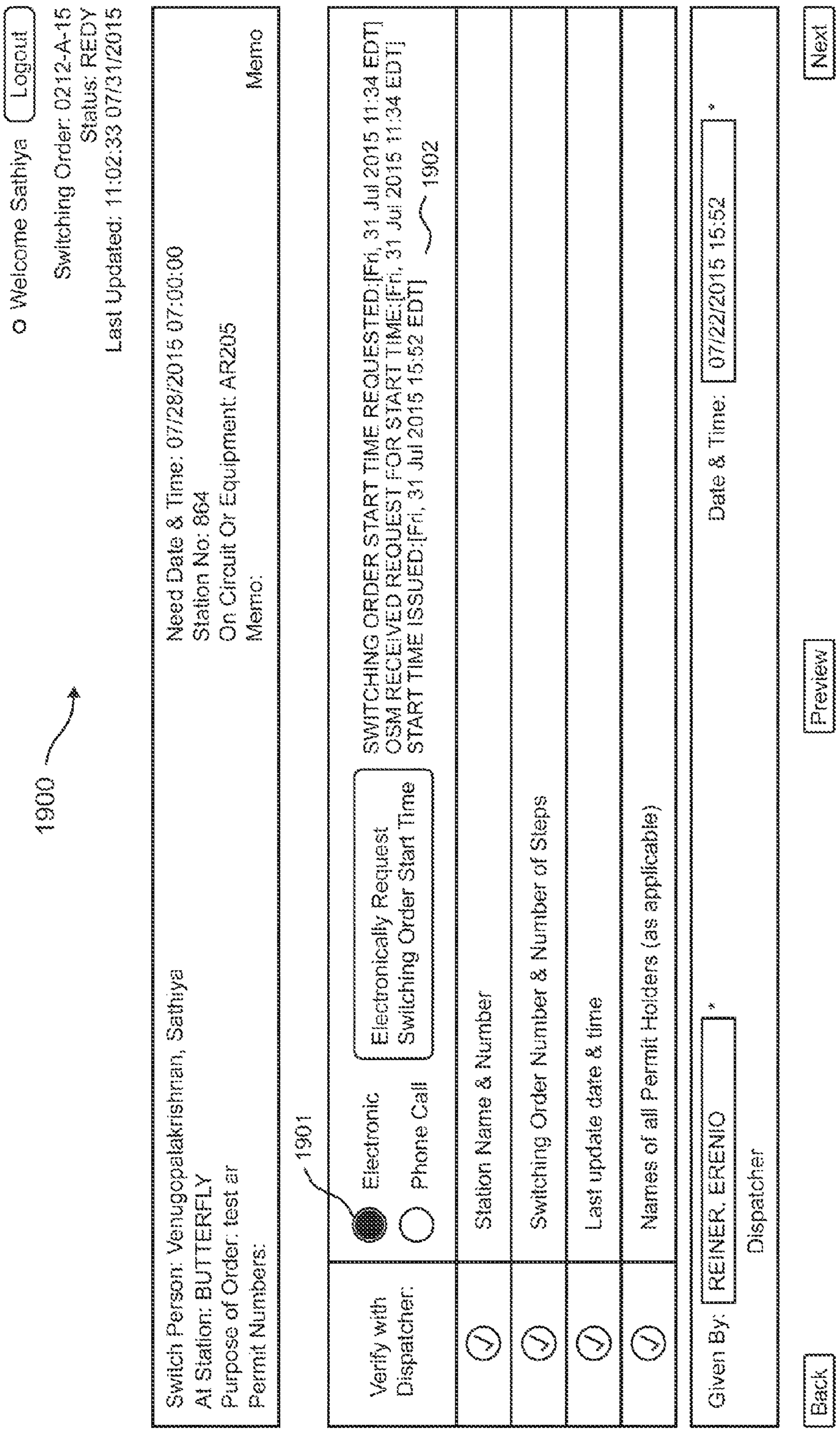
FIG. 19 illustrates a user interface confirming authorization to start a switching operation.

Authorization to Start: in some implementations, the disclosed systems and methods may enable a dispatcher or other administrator to authorize or otherwise to approve commencement of switching work remotely (e.g., electronically); upon authorization, switching personnel may begin the approved switching procedure. In that regard, FIG. 19 illustrates a user interface confirming authorization to start a switching operation. As indicated at 1901, an approval user interface 1900 may include an indication that authorization is provided electronically or telephonically, for example, and may also specifically note relevant times 1902 related to the switching operation and the authorization.

Auto Sync: if changes or modifications in a switching order are requested or necessitated while the switching is progress, the disclosed systems and methods, when in a "connected" or "online" mode of operation, may notify switching personnel of the update in real time or near real time, for example.

Figure 20:
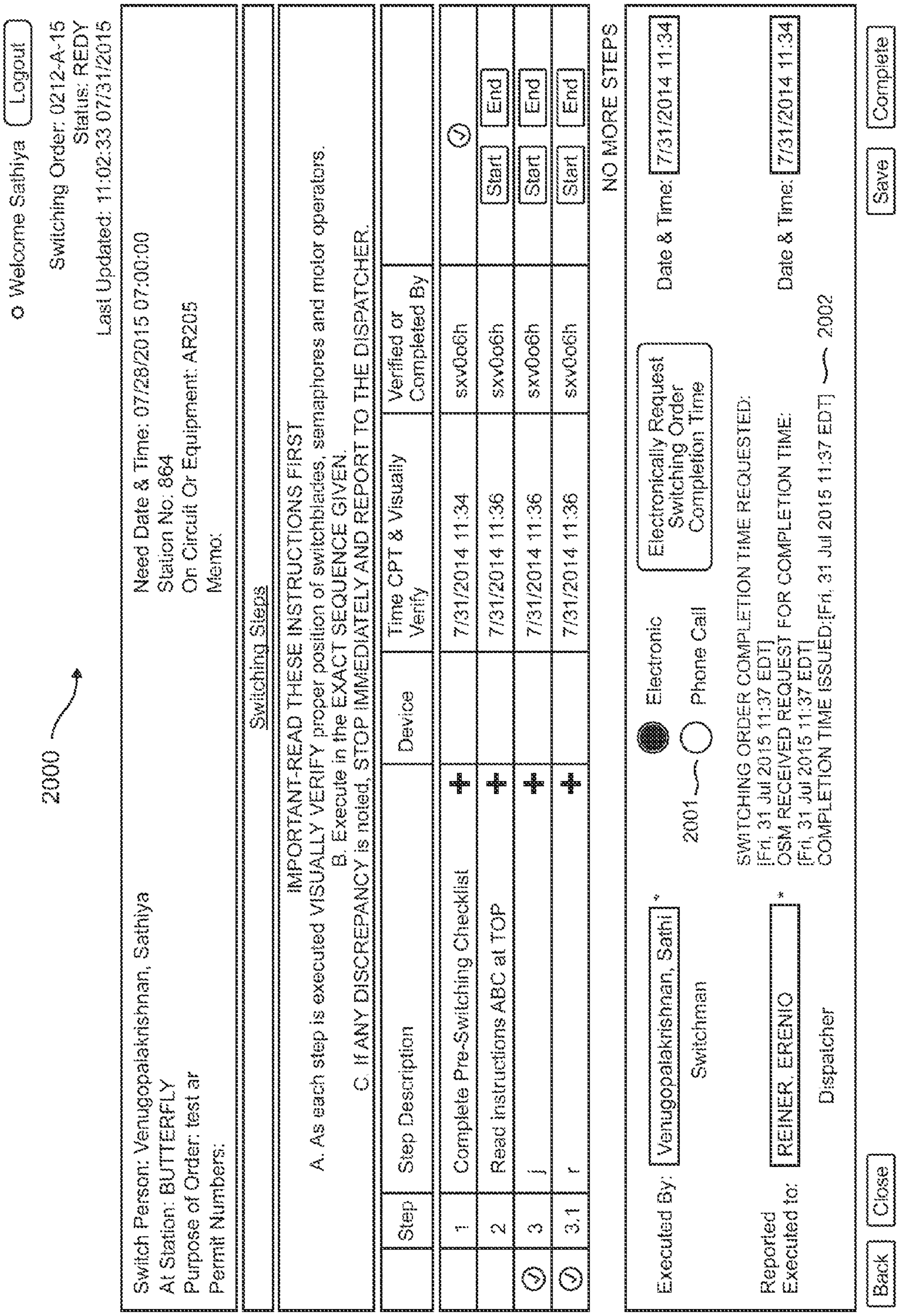
FIG. 20 illustrates a user interface confirming that a switching operation has been completed.

Confirmation of Completion: in accordance with some features, switching personnel may confirm that a switching operation has been completed; the disclosed systems and methods also facilitate subsequent acknowledgement of the completion by a dispatcher or other administrator. In that regard, FIG. 20 illustrates a user interface confirming that a switching operation has been completed. As indicated at 2001, completion confirmation user interface 2000 may include an indication that confirmation is provided electronically or telephonically, for example, and may also specifically note relevant times 2002 related to the switching operation and its completion.

Memos and Notes: the disclosed systems and methods allow switching personnel and other users to provide annotations, e.g., by adding memoranda to user interface screens, or by appending field notes or other written comments to individual switching steps.

Completed Orders: switching orders, once completed, may be reviewed for audit purposes.

As noted above, some switches or other components may have barcode labels, while some may have text labels. It may also be true that some components may not have appropriate labels at all. While OCR or RF communications may be used in place of or in addition to barcode identification of components, it is also possible to use device 100 to print labels (e.g., a barcode, a QR code, or a text label) that may be added and associated with a switch panel or other component during the switching sequence or other service call. Providing device 100 with a label printer or other suitable output device may avoid or mitigate the problem of labeling or RF tagging every switch and other component in the system prior to implementing the techniques described herein.

As noted above with respect to the "Auto Sync" feature, switching sequences may vary from time to time based upon operating conditions and other factors. In accordance with this feature, the latest switching sequences may be uploaded via a network to device 100 deployed by the switch operator. Thus the operator need not return from the field to get the latest or safest switch sequence.

In the event of multiple switch operators switching multiple switches or other components to accomplish a task, a remote coordinator may instruct the operators on the sequence timing of the switches. For example, a first switch operator switches a first switch on a first switch panel based upon a first command from the coordinator, the coordinator's power monitoring instrument panels indicate that the power has been switched, and so the coordinator may then issue a second command to the second switch operator to switch the second switch. The instructions may be through a voice (e.g., telephone) connection, though text messaging, e-mail, or video conferencing may also be employed as desired or appropriate. Where communication in this example is via telephone, a device 100 employed by a switch operator may be off-line during the switching sequence—some substations may allow for voice communication while not providing network connection for personnel on the property.

Figure 18:
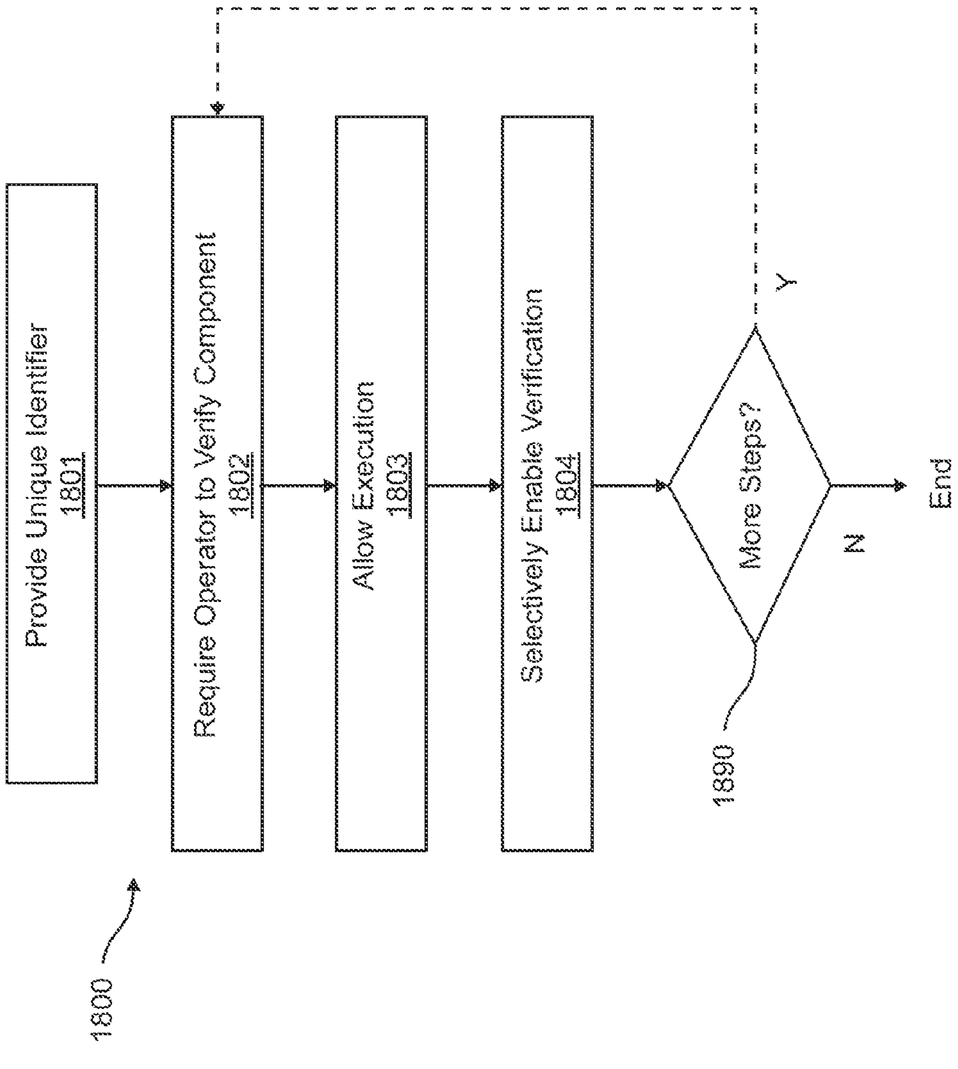
FIG. 18 is a flow diagram illustrating the general operational flow of a method of coordinating switching procedures in an electric power transmission and distribution system in accordance with an embodiment.

Turning back to the drawing figures, FIG. 18 is a flow diagram illustrating the general operational flow of a method of coordinating switching procedures in an electric power transmission and distribution system. As contemplated in FIG. 3, the process 1800 generally begins with providing a unique identifier to a component in the transmission and distribution system (block 1801). As set forth above, this identifier may be a barcode, text label, or non-visual identifier such as a magnetic strip or an RF identification tag or transceiver. In any event, the identifier generally serves to distinguish its associated component from every other component in the transmission and distribution system. In some embodiments, every component in the system is provided with a unique identifier a priori, though in some cases this might not be practical; in some embodiments, therefore, components may be provided with unique identifiers during service calls or routine maintenance, for example.

As indicated at block 1802, a method may require an operator to verify a specific component using the identifier. In that regard, it may be beneficial or even necessary to ensure that the operator is currently performing a specific switching step or procedure on a specific component in accordance with specific step-wise instructions in the switching order. Executing operations at the wrong time, or with respect to the wrong component, may result in failure to complete the switching order successfully, cause damage to the component or other elements of the system, or lead to injuries to the operator or other individuals. Accordingly, the verification indicated at block 1802 is intended to confirm that the component associated with and identified by the unique identifier is, in fact, the component that the operator is supposed to be working on during the present step in the switching procedure. As set forth above, this verification may include scanning with an imaging module or apparatus, for instance, or with an RF transceiver or other electronic or electromagnetic device, depending upon the nature of the unique identifier associated with the component.

A method may allow execution of a switching step as indicated at block 1803. In some embodiments, in the event that the component is verified as set forth above, the operator may be allowed to execute a switching step associated with the component. As set forth above, various operations are contemplated as a switching step, some of which may be dangerous if conducted out of order or erroneously with respect to the wrong component. Accordingly, it may be desirable that the operator is allowed to execute the step only in the event that the component is verified. In such instances, for example, an application running on a device such as described herein may prevent a user or operator from being able to see subsequent steps in a sequence unless the component is properly verified.

At block 1804, the method may selectively enable the operator to verify completion of the switching step using the identifier. In that regard, the component identifier may be scanned with an appropriate device (i.e., a barcode reader, imaging module, RE transceiver, etc.) as noted above when a switching order step is complete. In this instance, the scan may coincide with completion of the switching step, or may signal the completion of the switching step. Alternatively, the operator may provide additional input at or around the time of the scan to indicate that the step is completed with respect to the particular component associated with the scanned identifier.

If additional steps or procedures are required in accordance with the switching order (decision block 1890), the method may loop back to block 1802 as indicated by the dashed line; otherwise, the method may end. It will be appreciated that the iterative loop may return all the way to block 1801 in some embodiments in which every component in the system does not already have a unique identifier.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims

What is claimed is:

1. A method implemented in a computer system for coordinating switching procedures in an electric power transmission and distribution system; said method comprising:

providing a unique identifier for a component in the transmission and distribution system;

requiring an operator to verify the component using the identifier;

allowing the operator to execute a switching step associated with the component if the component is verified; and selectively enabling the operator o verify completion of the switching step using the identifier.

2. The method of claim 1 wherein the unique identifier is located proximate to the component and said providing a unique identifier comprises associating the component with global positioning system data.

3. The method of claim 1 wherein the unique identifier is a barcode and said requiring an operator comprises scanning the barcode with an imaging device.

4. The method of claim 3 wherein said selectively enabling comprises scanning the barcode with an imaging device and recording a timestamp associated with said scanning.

5. The method of claim 1 wherein the unique identifier is a radio frequency identification tag and said requiring comprises scanning the identification tag with a radio frequency transceiver.

6. The method of claim 5 wherein said selectively enabling comprises scanning the identification tag with a radio frequency transceiver and recording a timestamp associated with said scanning.

7. The method of claim 1 wherein said allowing comprises providing instructions regarding the switching step to the operator.

8. A device for use by a switching operator to facilitate switching procedures in an electric power transmission and distribution system; said device comprising computer hardware and a computer-readable storage medium and operative to:

scan a unique identifier associated with a component in the transmission and distribution system;

allow the operator to execute a switching step associated with the component if the component is verified during the scan; and selectively enable the operator to verify completion of the switching step using the identifier.

9. The device of claim 8 wherein the unique identifier is a barcode and the device comprises an imaging module.

10. The device of claim 8 wherein the unique identifier is a radio frequency identification tag and the device comprises a radio frequency transceiver.

11. The device of claim 8 further configured to receive instructions regarding the switching step from a remote location.

12. A method implemented in a computer system for coordinating switching procedures in an electric power transmission and distribution system; said method comprising:

providing a unique identifier for a component in the transmission and distribution system;

requiring an operator to verify, using the identifier, that the component is associated with a step in a switching procedure;

allowing the operator to execute the step if the component is verified; and requiring the operator to verify, using the identifier, that the step is complete prior to proceeding to a next step in the switching procedure.

13. The method of claim 12 wherein the unique identifier is located proximate to the component and said providing a unique identifier comprises associating the component with global positioning system data.

14. The method of claim 12 wherein the unique identifier is a barcode and wherein the verifications comprise scanning the barcode with an imaging device.

15. The method of claim 14 wherein verifying that the step is complete comprises scanning the barcode with an imaging device and recording a timestamp associated with said scanning.

16. The method of claim 12 wherein the unique identifier is a radio frequency identification tag and wherein the verifications comprise scanning the identification tag with a radio frequency transceiver.

17. The method of claim 16 wherein verifying that the step is complete comprises scanning the identification tag with a radio frequency transceiver and recording a timestamp associated with said scanning.

18. The method of claim 12 wherein said allowing comprises providing instructions regarding the step to the operator.

19. The method of claim 18 wherein said allowing further comprises receiving instructions regarding the step from a remote location.

20. The method of claim 12 wherein said requiring the operator to verify, using the identifier, that the step is complete comprises preventing the operator from viewing the next step until completion of the step is verified.

* * * * *